(12) United States Patent
Kitada

(10) Patent No.: US 12,085,700 B2
(45) Date of Patent: Sep. 10, 2024

(54) IMAGING OPTICAL SYSTEM, IMAGE CAPTURE DEVICE, AND CAMERA SYSTEM

(71) Applicant: Panasonic Intellectual Property Management Co., Ltd., Osaka (JP)

(72) Inventor: Takahiro Kitada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 148 days.

(21) Appl. No.: 17/085,410

(22) Filed: Oct. 30, 2020

(65) Prior Publication Data

US 2021/0132346 A1 May 6, 2021

(30) Foreign Application Priority Data

Nov. 1, 2019 (JP) .................................. 2019-199520
Sep. 29, 2020 (JP) .................................. 2020-164074

(51) Int. Cl.
*G02B 15/177* (2006.01)
*G02B 15/14* (2006.01)
(Continued)

(52) U.S. Cl.
CPC ....... *G02B 15/177* (2013.01); *G02B 15/1445* (2019.08); *G02B 15/20* (2013.01); *G02B 27/0025* (2013.01); *H04N 23/55* (2023.01)

(58) Field of Classification Search
CPC ...... G02B 13/18; G02B 15/14; G02B 15/144; G02B 15/1445; G02B 15/144503;
(Continued)

(56) References Cited

U.S. PATENT DOCUMENTS 7,443,603 B2 * 10/2008 Saori .................... G02B 15/177
359/686
9,377,606 B2 * 6/2016 Nakahara ....... G02B 15/144507
(Continued)

FOREIGN PATENT DOCUMENTS

JP 2007-10914 1/2007
JP 2019-133072 8/2019
(Continued)

OTHER PUBLICATIONS

English Translation of WO-2018078887 (May 2018) (Year: 2018).*
(Continued)

*Primary Examiner* — Jie Lei
*Assistant Examiner* — Kuei-Jen L Edenfield
(74) *Attorney, Agent, or Firm* — Wenderoth, Lind & Ponack, L.L.P.

(57) ABSTRACT

An imaging optical system includes: a first lens group having negative power; a second lens group having positive power; a third lens group having negative power; and a fourth lens group having power, which are arranged in this order such that the first lens group is located closest to an object and the fourth lens group is located closest to an optical image. The first lens group includes: a first negative lens; a second negative lens; and a third negative lens which is a meniscus lens having negative power and a convex surface facing the optical image, which are arranged in this order such that the first negative lens is located closest to the object and the third negative lens is located closest to the optical image. During focusing from an infinity focus point toward a close focus point, the third lens group moves along an optical axis.

11 Claims, 10 Drawing Sheets

(51) Int. Cl.
*G02B 15/20* (2006.01)
*G02B 27/00* (2006.01)
*H04N 23/55* (2023.01)

(58) Field of Classification Search
CPC ............ G02B 15/144511; G02B 15/20; G02B 15/177; G02B 27/0025; G02B 15/14455; G02B 27/00; H04N 5/2254; H04N 23/55
USPC ................................................ 359/686, 715
See application file for complete search history.

(56) References Cited

U.S. PATENT DOCUMENTS

| | | |
|---|---|---|
| 2007/0002459 A1 | 1/2007 | Saori |
| 2016/0124200 A1* | 5/2016 | Obikane ............ G02B 27/0025 359/557 |
| 2018/0100995 A1* | 4/2018 | Nishio ........... G02B 15/144511 |
| 2018/0299657 A1* | 10/2018 | Yoshinaga ..... G02B 15/145519 |

FOREIGN PATENT DOCUMENTS

| | | | | | |
|---|---|---|---|---|---|
| WO | WO-2016121930 | * | 8/2016 | ............. | G02B 13/18 |
| WO | WO-2018078887 | * | 5/2018 | ............. | G02B 13/00 |

OTHER PUBLICATIONS

English Translation of WO-2016121930 (Aug. 2016) (Year: 2016).*
Notice of Reasons for Refusal dated Oct. 17, 2023 in corresponding Japanese Patent Application No. 2020-164074, with English-language translation.

* cited by examiner

IMAGING OPTICAL SYSTEM, IMAGE CAPTURE DEVICE, AND CAMERA SYSTEM

CROSS-REFERENCE TO RELATED APPLICATION

This application is based on and claims the benefit of foreign priority to Japanese Patent Application No. 2019-199520 filed on Nov. 1, 2019 and Japanese Patent Application No. 2020-164074 filed on Sep. 29, 2020, the entire disclosures of which are hereby incorporated by reference.

TECHNICAL FIELD

The present disclosure relates to an imaging optical system including a plurality of lens groups, and also relates to an image capture device and camera system including such a zoom lens system.

BACKGROUND ART

JP 2019-133072 A discloses a zoom lens system including: a first lens group having negative refractive power; a second lens group having positive refractive power; a third lens group having negative refractive power; and a fourth lens group having positive refractive power, where these first through fourth lens groups are arranged in this order such that the first lens group is located closer to an object than any other lens group and that the fourth lens group is located closer to an image than any other lens group. The zoom lens system performs zooming from a wide-angle end toward a telephoto end by changing intervals on the optical axis between the respective lens groups and also performs focusing by moving the third lens group along the optical axis.

SUMMARY

The present disclosure provides an imaging optical system with the ability to compensate for various types of aberrations sufficiently while reducing a variation in angle of view during focusing, and also provides an image capture device and camera system that include such an imaging optical system.

An imaging optical system according to the present disclosure includes, as a plurality of lens groups: a first lens group having negative power; a second lens group having positive power; a third lens group having negative power; and a fourth lens group having power. The first, second, third, and fourth lens groups are arranged in this order such that the first lens group is located closer to an object than any other lens group and that the fourth lens group is located closer to an optical image than any other lens group. While the imaging optical system is zooming from a wide-angle end toward a telephoto end during a shooting session, intervals between the plurality of lens groups change. The first lens group includes: a first negative lens; a second negative lens; and a third negative lens. The first, second, and third negative lenses are arranged in this order such that the first negative lens is located closer to the object than any other negative lens and that the third negative lens is located closer to the optical image than any other negative lens. The third negative lens is a meniscus lens having negative power and having a convex surface facing the optical image. The third lens group includes at least two lenses. While the imaging optical system is focusing from an infinity focus point toward a close focus point, the third lens group moves along an optical axis.

A camera system according to the present disclosure includes an interchangeable lens unit and a camera body. The interchangeable lens unit includes the imaging optical system described above. The camera body includes an image sensor and a camera mount. The camera body is to be connected removably to the interchangeable lens unit via the camera mount. The image sensor receives an optical image formed by the imaging optical system and transforms the optical image into an electrical image signal. The interchangeable lens unit forms the optical image of the object on the image sensor.

An image capture device according to the present disclosure transforms an optical image of the object into an electrical image signal and displays and/or stores the image signal transformed. The image capture device includes the imaging optical system described above and an image sensor. The imaging optical system forms the optical image of the object. The image sensor transforms the optical image formed by the imaging optical system into the electrical image signal.

BRIEF DESCRIPTION OF DRAWINGS

The figures depict one or more implementations in accordance with the present teaching, by way of example only, not by way of limitations. In the figures, like reference numerals refer to the same or similar elements.

DESCRIPTION OF EMBODIMENTS

Figure 1:
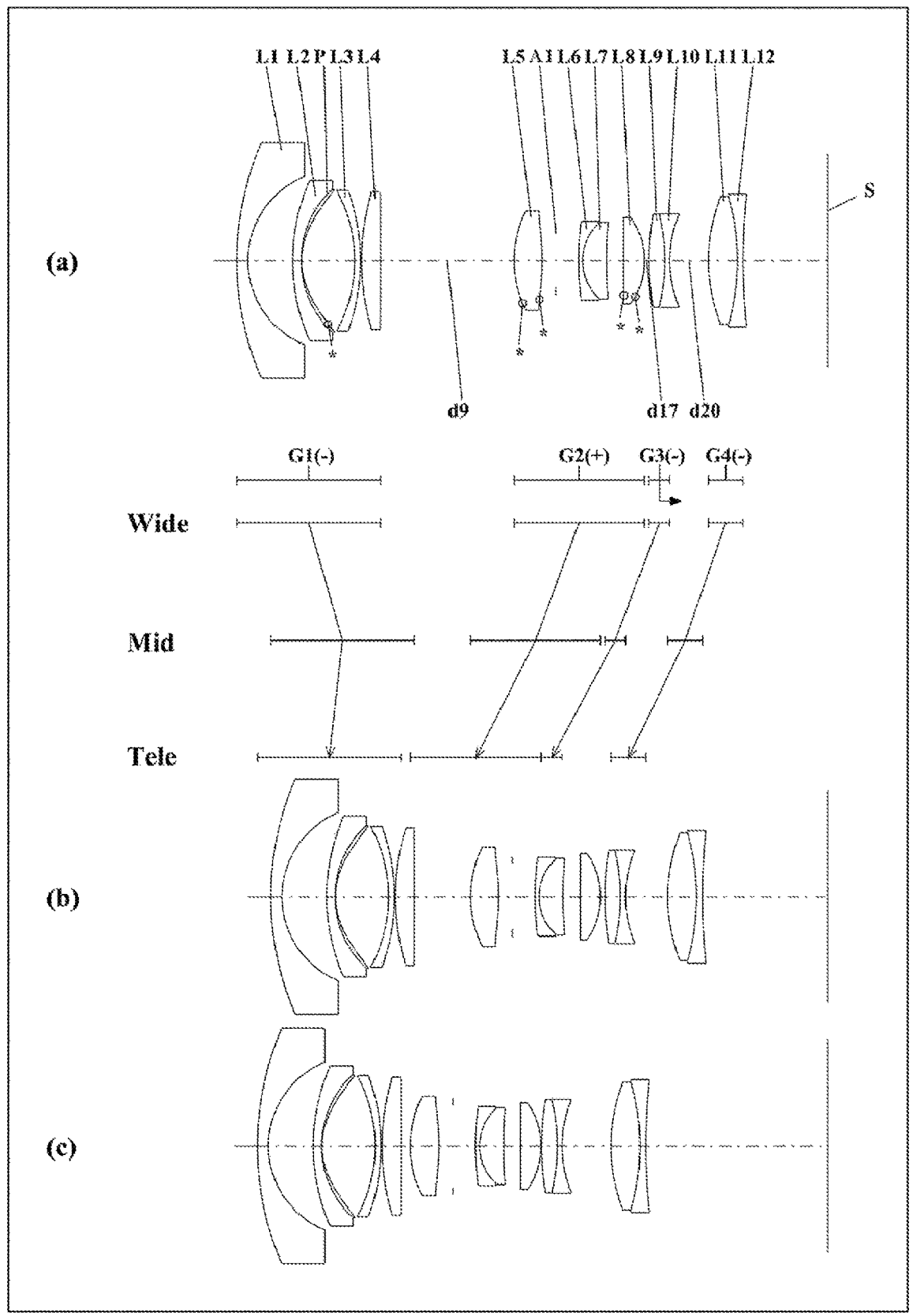
FIG. 1 illustrates lens arrangements showing what state an imaging optical system according to a first embodiment (corresponding to a first example of numerical values) assumes at an infinity focus point.

Embodiments of the present disclosure will be described in detail with reference to the accompanying drawings. Note that unnecessarily detailed description may be omitted. For example, detailed description of already well-known matters and redundant description of substantially the same configuration may be omitted. This is done to avoid making the following description overly redundant and to help one of ordinary skill in the art understand the present disclosure.

In addition, note that the accompanying drawings and the following description are provided to help one of ordinary skill in the art understand the present disclosure fully and should not be construed as limiting the scope of the present disclosure, which is defined by the appended claims.

First to Fourth Embodiments

FIGS. 1, 3, 5, and 7 illustrate lens arrangement diagrams according to first, second, third, and fourth embodiments, each showing what state an imaging optical system assumes at an infinity focus point.

In FIGS. 1, 3, 5, and 7, portion (a) illustrates a lens arrangement at the wide-angle end (which is a state with the shortest focal length fW); portion (b) illustrates a lens arrangement at an intermediate position (which is a state with an intermediate focal length fM=√(fW*fT)); and portion (c) illustrates a lens arrangement at the telephoto end (which is a state with the longest focal length fT). Note that portions (a), (b), and (c) of FIGS. 1, 3, 5, and 7 have the same aspect ratio.

Also, in FIGS. 1, 3, 5, and 7, the polygon arrows shown between portions (a) and (b) thereof each connect together the respective positions of the lens groups at the wide-angle end (Wide), intermediate position (Mid), and telephoto end (Tele) from top to bottom. Note that these polygon arrows just connect the wide-angle end to the intermediate position and the intermediate position to the telephoto end with the curves, and do not indicate the actual movement of the lens group.

Also, the arrows added to the lens groups in FIGS. 1, 3, 5, and 7 each indicate the direction of movement while the imaging optical system is focusing from the infinity focus point toward the close focus point. Note that in FIGS. 1, 3, 5, and 7, the reference signs of respective lens groups are shown under the respective lens groups in portion (a) thereof, and therefore, an arrow indicating focusing is shown under the sign of each lens group for convenience sake. The directions of movement of the respective lens groups during focusing will be described more specifically later with respect to each of those embodiments.

Furthermore, in FIGS. 1, 3, 5, and 7, the asterisk (*) attached to a particular surface indicates that the surface is an aspheric surface. Note that in the lenses included in each lens group, a surface with no asterisks is a spherical surface. Furthermore, the signs (+) and (−) added to the reference signs of the respective lens groups in FIGS. 1, 3, 5, and 7 indicate the powers of the respective lens groups. Furthermore, in FIGS. 1, 3, 5, and 7, the straight line drawn at the right end indicates the position of the image plane S (i.e., a surface, facing the object, of the image sensor).

First Embodiment

FIG. 1 illustrates an imaging optical system according to a first embodiment.

The imaging optical system includes: a first lens group G1 having negative power; a second lens group G2 having positive power; a third lens group G3 having negative power; and a fourth lens group G4 having negative power. The first lens group G1, the second lens group G2, the third lens group G3, and the fourth lens group G4 are arranged in this order such that the first lens group G1 is located closer to an object than any other lens group and that the fourth lens group G4 is located closer to an image (optical image) than any other lens group. Each of the first to fourth lens groups G1-G4 is a lens group. That is to say, the imaging optical system includes a plurality of lens groups. In this embodiment, the plurality of lens groups is made up of the first to fourth lens groups G1-G4. Each lens group includes at least one lens.

The first lens group G1 includes: a first lens L1 having negative power; a second lens L2 having negative power; a third lens L3 having negative power, and a fourth lens L4 having positive power. In this embodiment, the first lens group G1 is made up of the first to fourth lenses L1-L4. The first lens L1, the second lens L2, the third lens L3, and the fourth lens L4 are arranged in this order such that the first lens L1 is located closer to the object than any other member of this first lens group G1 and that the fourth lens L4 is located closer to the image than any other member of this first lens group G1.

The second lens group G2 includes: a fifth lens L5 having positive power; an aperture stop A1; a sixth lens L6 having negative power; a seventh lens L7 having positive power; and an eighth lens L8 having positive power. In this embodiment, the second lens group G2 is made up of the fifth to eighth lenses L5-L8 and the aperture stop A1. The fifth lens L5, the aperture stop A1, the sixth lens L6, the seventh lens L7, and the eighth lens L8 are arranged in this order such that the fifth lens L5 is located closer to the object than any other member of this second lens group G2 and that the eighth lens L8 is located closer to the image than any other member of this second lens group G2.

The third lens group G3 includes: a ninth lens L9 having positive power; and a tenth lens L10 having negative power. In this embodiment, the third lens group G3 is made up of the ninth lens L9 and the tenth lens L10. The ninth lens L9 and the tenth lens L10 are arranged in this order such that the ninth lens L9 is located closer to the object than the tenth lens L10 and that the tenth lens L10 is located closer to the image than the ninth lens L9.

The fourth lens group G4 includes an eleventh lens L11 having positive power and a twelfth lens L12 having negative power. In this embodiment, the fourth lens group G4 is made up of the eleventh lens L11 and the twelfth lens L12. The eleventh lens L11 and the twelfth lens L12 are arranged in this order such that the eleventh lens L11 is located closer to the object than the twelfth lens L12 and that the twelfth lens L12 is located closer to the image than the eleventh lens L11.

The respective lenses will be described.

First of all, the respective lenses that form the first lens group G1 will be described. The first lens L1 is a meniscus lens with a convex surface facing the object. The second lens L2 is a meniscus lens with a convex surface facing the object. The other surface facing the image of the second lens L2 is an aspheric surface to which a resin layer P is bonded. The third lens L3 is a meniscus lens with a convex surface facing the image. The fourth lens L4 is a biconvex lens. The first lens L1 is an example of a first negative lens. The second lens L2 is an example of a second negative lens. The third lens L3 is an example of a third negative lens. As used herein, the "negative lens" means a lens having negative power.

Next, the respective lenses that form the second lens group G2 will be described. The fifth lens L5 is a biconvex lens, both surfaces of which are aspheric surfaces. The sixth lens L6 is a meniscus lens with a convex surface facing the object. The seventh lens L7 is a meniscus lens with a convex surface facing the object. The sixth lens L6 and the seventh lens L7 together form a bonded lens by being bonded together with an adhesive, for example. The eighth lens L8 is a biconvex lens, both surfaces of which are aspheric surfaces. The fifth lens L5 is an example of a front lens group. The sixth to eighth lenses L6-L8 are an example of lenses that form a rear lens group. The rear lens group has negative power in total. The seventh lens L7 is an example of a positive lens that satisfies Inequality (2) to be described later. As used herein, the "positive lens" means a lens having positive power.

Next, the respective lenses that form the third lens group G3 will be described. The ninth lens L9 is a biconvex lens. The tenth lens L10 is a biconcave lens. The ninth lens L9 and the tenth lens L10 together form a bonded lens by being bonded together with an adhesive, for example. The ninth lens L9 is an example of a positive lens that satisfies Inequality (4) to be described later.

Next, the respective lenses that form the fourth lens group G4 will be described. The eleventh lens L11 is a biconvex lens. The twelfth lens L12 is a biconcave lens. The eleventh lens L11 and the twelfth lens L12 together form a bonded lens by being bonded together with an adhesive, for example. The twelfth lens L12 is an example of a negative lens that satisfies Inequality (3) to be described later.

In each of the plurality of lens groups, a plurality of lenses included in the lens group move together. For example, the first to fourth lenses L1-L4 included in the first lens group G1 move together.

While the imaging optical system is zooming from the wide-angle end toward the telephoto end during a shooting session, the first lens group G1 moves to draw a locus that is convex toward the image. The plurality of lenses that form the second lens group L2 and the aperture stop A1 together move toward the object. The third lens group G3 moves toward the object. The fourth lens group G4 also moves toward the object. In addition, as the imaging optical system is zooming, the intervals between the plurality of lens groups change. More specifically, the respective lens groups move along the optical axis such that the interval between the first lens group G1 and the second lens group G2 decreases, the interval between the second lens group G2 and the third lens group G3 decreases, and the interval between the third lens group G3 and the fourth lens group G4 increases.

While the imaging optical system is focusing from the infinity focus point toward the close focus point, the third lens group G3 moves along the optical axis toward the image plane S.

Second Embodiment

Figure 3:
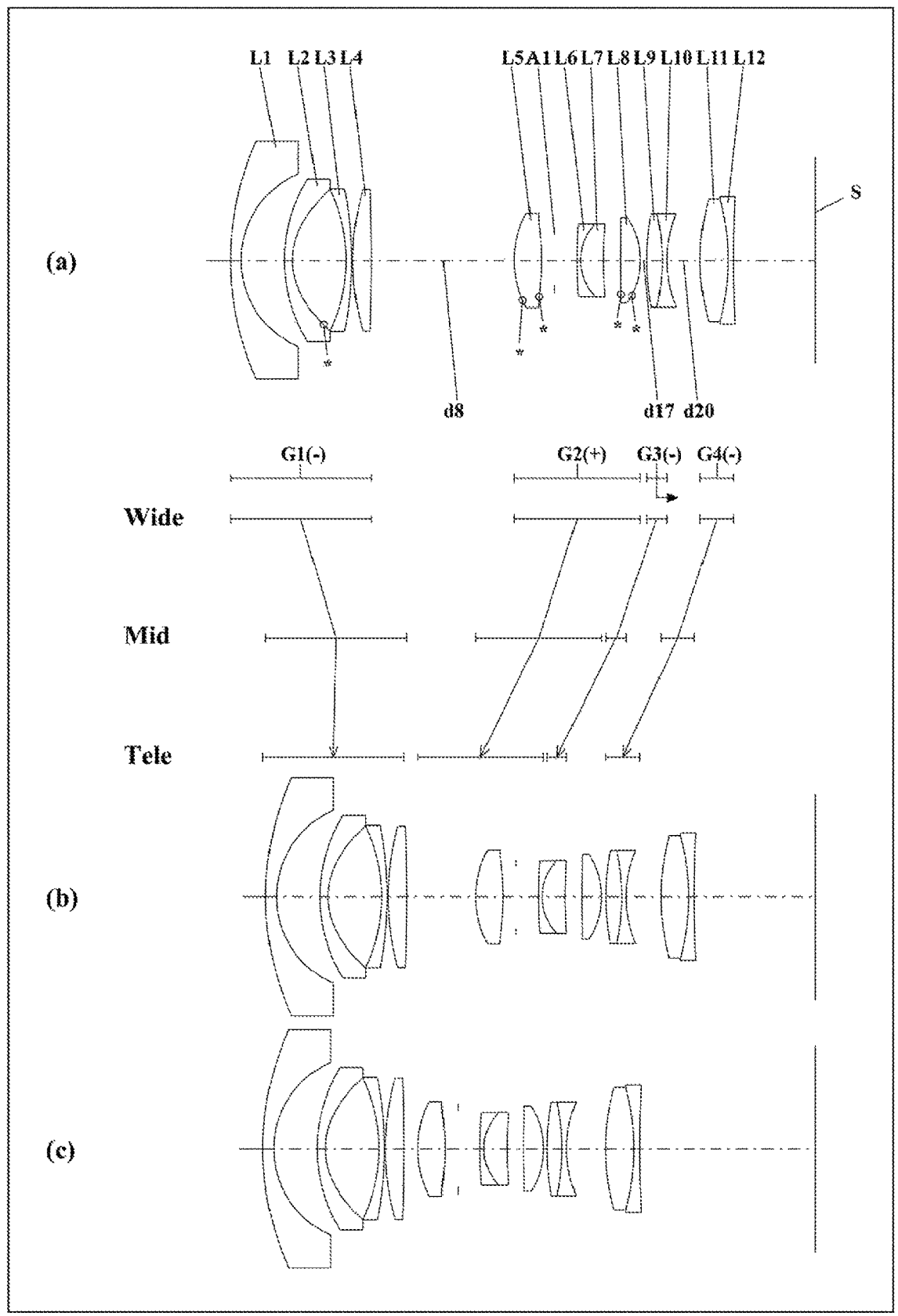
FIG. 3 illustrates lens arrangements showing what state an imaging optical system according to a second embodiment (corresponding to a second example of numerical values) assumes at an infinity focus point.

FIG. 3 illustrates an imaging optical system according to a second embodiment.

In an imaging optical system according to the second embodiment, no resin layer P is bonded to the second lens L2, which is a difference from the imaging optical system according to the first embodiment. In addition, parameters determining the properties of the imaging optical system, such as distances between the plurality of lens groups, are also different from those of the first embodiment. The respective parameters will be enumerated in a second example of numerical values to be described later. In the other respects, the second embodiment has the same configuration as the first embodiment described above.

Third Embodiment

Figure 5:
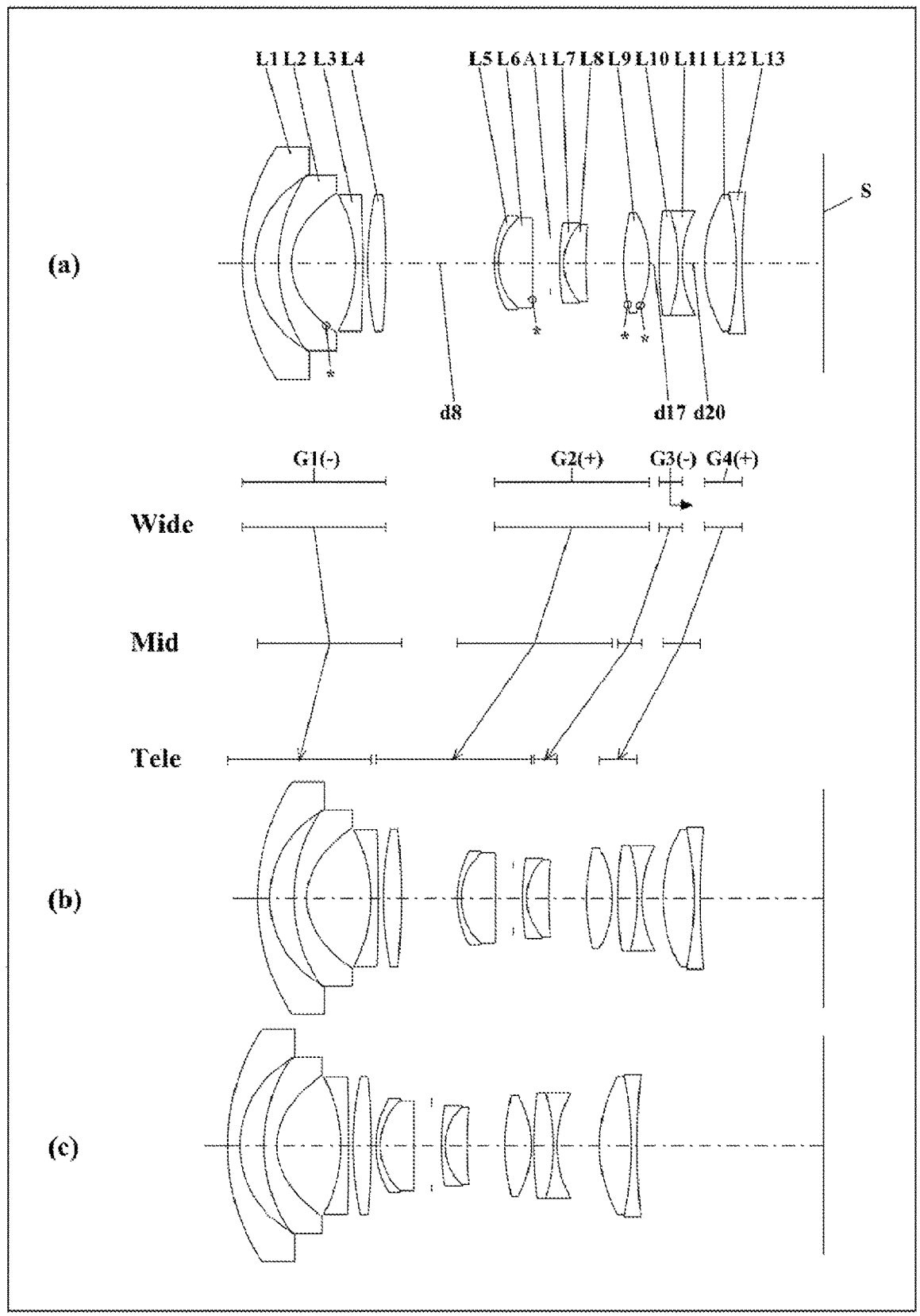
FIG. 5 illustrates lens arrangements showing what state an imaging optical system according to a third embodiment (corresponding to a third example of numerical values) assumes at an infinity focus point.

FIG. 5 illustrates an imaging optical system according to a third embodiment.

In an imaging optical system according to the third embodiment, no resin layer P is bonded to the second lens L2, which is a difference from the imaging optical system according to the first embodiment. In addition, the fourth lens group G4 has positive power, which is another difference from the first embodiment. Also, in the second lens group G2, two lenses are arranged closer to the object than the aperture stop A1 is, which is still another difference from the first embodiment. Furthermore, parameters determining the properties of the imaging optical system, such as distances between the plurality of lens groups, are also different from those of the first embodiment. The respective parameters will be enumerated in a third example of numerical values to be described later. In the following description, description of constituent elements of the third embodiment having the same function as their counterparts of the first embodiment will be omitted as appropriate.

The imaging optical system includes: a first lens group G1 having negative power; a second lens group G2 having positive power; a third lens group G3 having negative power; and a fourth lens group G4 having positive power. The first, second, third, and fourth lens groups G1-G4 are arranged in this order such that the first lens group G1 is located closer to an object than any other lens group and that the fourth lens group G4 is located closer to an image than any other lens group.

The first lens group G1 is made up of: a first lens L1 having negative power; a second lens L2 having negative power; a third lens L3 having negative power; and a fourth lens L4 having positive power, which are arranged in this order such that the first lens L1 is located closer to the object than any other member of this first lens group G1 and that the fourth lens L4 is located closer to the image than any other member of this first lens group G1.

The second lens group G2 is made up of: a fifth lens L5 having negative power; a sixth lens L6 having positive power; an aperture stop A1; a seventh lens L7 having negative power; an eighth lens L8 having positive power; and a ninth lens L9 having positive power, which are arranged in this order such that the fifth lens L5 is located closer to the object than any other member of this second lens group G2 and that the ninth lens L9 is located closer to the image than any other member of this second lens group G2.

The third lens group G3 is made up of: a tenth lens L10 having positive power; and an eleventh lens L11 having negative power, which are arranged in this order such that the tenth lens L10 is located closer to the object than the eleventh lens L11 and that the eleventh lens L11 is located closer to the image than the tenth lens L10.

The fourth lens group G4 is made up of a twelfth lens L12 having positive power and a thirteenth lens L13 having negative power, which are arranged in this order such that the twelfth lens L12 is located closer to the object than the thirteenth lens L13 and that the thirteenth lens L13 is located closer to the image than the twelfth lens L12.

The respective lenses will be described.

First of all, the respective lenses that form the first lens group G1 will be described. The first lens L1 is a meniscus lens with a convex surface facing the object. The second lens L2 is a meniscus lens with a convex surface facing the object, and a surface, facing the image, of the second lens L2 is an aspheric surface. The third lens L3 is a meniscus lens with a convex surface facing the image. The fourth lens L4 is a biconvex lens. The first lens L1 is an example of a first negative lens. The second lens L2 is an example of a second negative lens. The third lens L3 is an example of a third negative lens.

Next, the respective lenses that form the second lens group G2 will be described. The fifth lens L5 is a meniscus lens with a convex surface facing the object. The sixth lens L6 is a biconvex lens, a surface of which facing the image is an aspheric surface. The fifth lens L5 and the sixth lens L6 together form a bonded lens by being bonded together with an adhesive, for example. The seventh lens L7 is a meniscus lens with a convex surface facing the object. The eighth lens L8 is a meniscus lens with a convex surface facing the object. The seventh lens L7 and the eighth lens L8 together form a bonded lens by being bonded together with an adhesive, for example. The ninth lens L9 is a biconvex lens, both surfaces of which are aspheric surfaces. The fifth lens L5 and the sixth lens L6 are an example of a front lens group. The front lens group has positive power in total. The seventh to ninth lenses L7-L9 are an example of lenses that form a rear lens group. The eighth lens L8 is an example of a positive lens that satisfies Inequality (2) to be described later.

Next, the respective lenses that form the third lens group G3 will be described. The tenth lens L10 is a biconvex lens. The eleventh lens L11 is a biconcave lens. The tenth lens L10 and the eleventh lens L11 together form a bonded lens by being bonded together with an adhesive, for example. The tenth lens L10 is an example of a positive lens that satisfies Inequality (4) to be described later.

Next, the respective lenses that form the fourth lens group G4 will be described. The twelfth lens L12 is a biconvex lens. The thirteenth lens L13 is a biconcave lens. The twelfth lens L12 and the thirteenth lens L13 together form a bonded lens by being bonded together with an adhesive, for example. The thirteenth lens L13 is an example of a negative lens that satisfies Inequality (3) to be described later.

While the imaging optical system is zooming from the wide-angle end toward the telephoto end during a shooting session, the first lens group G1 moves to draw a locus that is convex toward the image. The plurality of lenses that form the second lens group L2 and the aperture stop A1 together move toward the object. The third lens group G3 moves toward the object. The fourth lens group G4 also moves toward the object. In addition, as the imaging optical system is zooming, the plurality of lens groups move along the optical axis such that the interval between the first lens group G1 and the second lens group G2 decreases, the interval between the second lens group G2 and the third lens group G3 decreases, and the interval between the third lens group G3 and the fourth lens group G4 decreases from the wide-angle end through an intermediate position but increases from the intermediate position through the telephoto end.

While the imaging optical system is focusing from the infinity focus point toward the close focus point, the third lens group G3 moves along the optical axis toward the image plane S.

Fourth Embodiment

Figure 7:
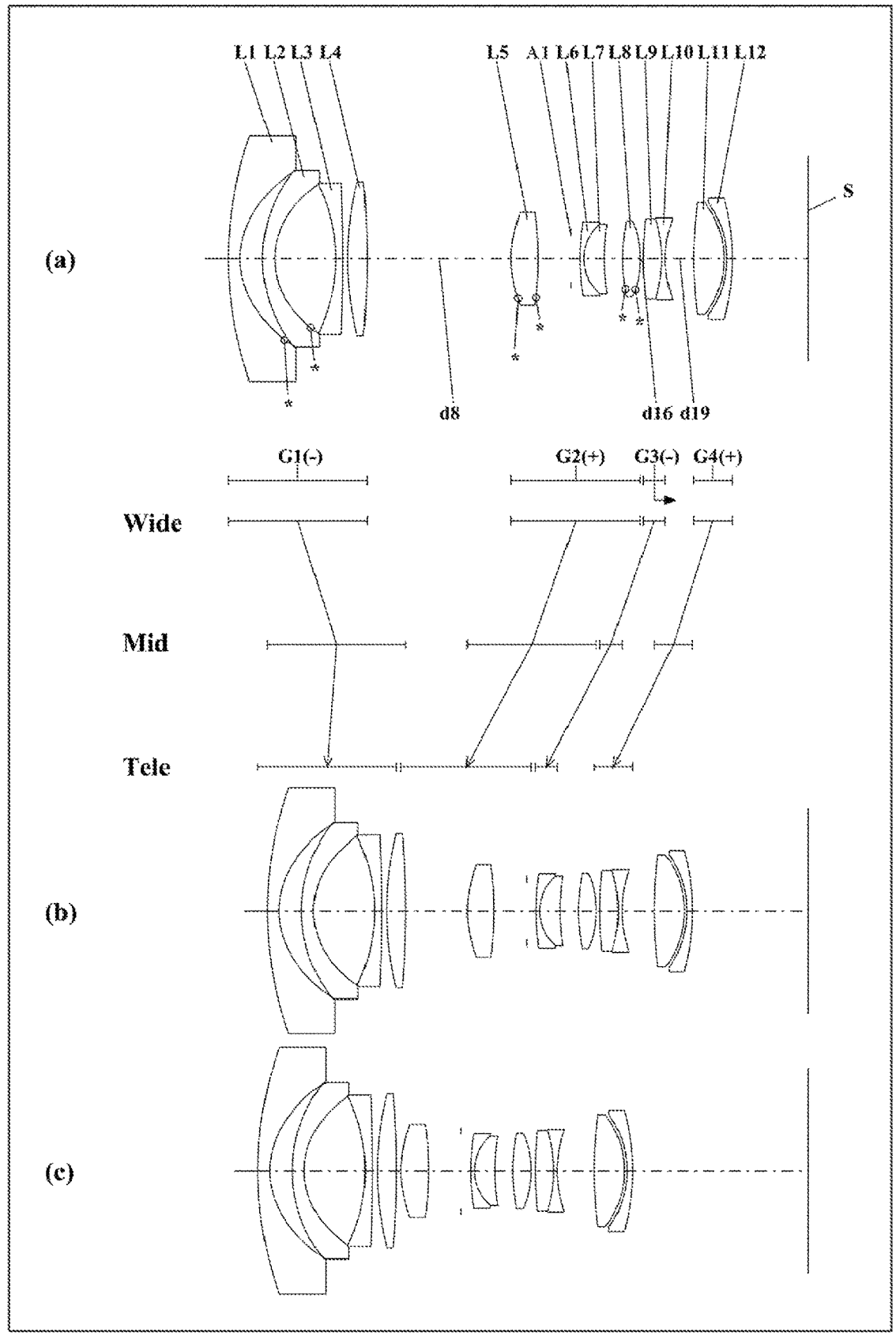
FIG. 7 illustrates lens arrangements showing what state an imaging optical system according to a fourth embodiment (corresponding to a fourth example of numerical values) assumes at an infinity focus point.

FIG. 7 illustrates an imaging optical system according to a fourth embodiment.

In an imaging optical system according to the fourth embodiment, no resin layer P is bonded to the second lens L2, which is a difference from the imaging optical system according to the first embodiment. In addition, a surface facing the image of the first lens L1 is an aspheric surface, which is another difference from the first embodiment. Also, the fourth lens group G4 has positive power, which is still another difference from the first embodiment. Furthermore, the twelfth lens L12 is a meniscus lens, which is yet another difference from the first embodiment. Furthermore, parameters determining the properties of the imaging optical system, such as distances between the plurality of lens groups, are also different from those of the first embodiment. The respective parameters will be enumerated in a fourth example of numerical values to be described later. In the following description, description of constituent elements of the fourth embodiment having the same function as their counterparts of the first embodiment will be omitted as appropriate.

The imaging optical system includes: a first lens group G1 having negative power; a second lens group G2 having positive power; a third lens group G3 having negative power; and a fourth lens group G4 having positive power. The first, second, third, and fourth lens groups G1-G4 are arranged in this order such that the first lens group G1 is located closer to an object than any other lens group and that the fourth lens group G4 is located closer to an image than any other lens group.

The first lens group G1 is made up of: a first lens L1 having negative power; a second lens L2 having negative power; a third lens L3 having negative power; and a fourth lens L4 having positive power, which are arranged in this order such that the first lens L1 is located closer to the object than any other member of this first lens group G1 and that the fourth lens L4 is located closer to the image than any other member of this first lens group G1.

The second lens group G2 is made up of: a fifth lens L5 having positive power; an aperture stop A1; a sixth lens L6 having negative power; a seventh lens L7 having positive power; and an eighth lens L8 having positive power, which are arranged in this order such that the fifth lens L5 is located closer to the object than any other member of this second lens group G2 and that the eighth lens L8 is located closer to the image than any other member of this second lens group G2.

The third lens group G3 is made up of: a ninth lens L9 having positive power; and a tenth lens L10 having negative power, which are arranged in this order such that the ninth lens L9 is located closer to the object than the tenth lens L10 and that the tenth lens L10 is located closer to the image than the ninth lens L9.

The fourth lens group G4 is made up of an eleventh lens L11 having positive power and a twelfth lens L12 having negative power, which are arranged in this order such that the eleventh lens L11 is located closer to the object than the twelfth lens L12 and that the twelfth lens L12 is located closer to the image than the eleventh lens L11.

The respective lenses will be described.

First of all, the respective lenses that form the first lens group G1 will be described. The first lens L1 is a meniscus lens with a convex surface facing the object and a surface, facing the image, of the first lens L1 is an aspheric surface. The second lens L2 is a meniscus lens with a convex surface facing the object, and a surface, facing the image, of the second lens L2 is an aspheric surface. The third lens L3 is a meniscus lens with a convex surface facing the image. The fourth lens L4 is a biconvex lens. The first lens L1 is an example of a first negative lens. The second lens L2 is an example of a second negative lens. The third lens L3 is an example of a third negative lens.

Next, the respective lenses that form the second lens group G2 will be described. The fifth lens L5 is a biconvex lens, both surfaces of which are aspheric surfaces. The sixth lens L6 is a meniscus lens with a convex surface facing the object. The seventh lens L7 is a meniscus lens with a convex surface facing the object. The sixth lens L6 and the seventh lens L7 together form a bonded lens by being bonded together with an adhesive, for example. The eighth lens L8 is a biconvex lens, both surfaces of which are aspheric surfaces. The fifth lens L5 is an example of a front lens group. The sixth to eighth lenses L6-L8 are an example of lenses that form a rear lens group. The seventh lens L7 is an example of a positive lens that satisfies Inequality (2) to be described later.

Next, the respective lenses that form the third lens group G3 will be described. The ninth lens L9 is a biconvex lens. The tenth lens L10 is a biconcave lens. The ninth lens L9 and the tenth lens L10 together form a bonded lens by being bonded together with an adhesive, for example. The ninth lens L9 is an example of a positive lens that satisfies Inequality (4) to be described later.

Next, the respective lenses that form the fourth lens group G4 will be described. The eleventh lens L11 is a biconvex lens. The twelfth lens L12 is a meniscus lens with a convex surface facing the image. The twelfth lens L12 is an example of a negative lens that satisfies Inequality (3) to be described later.

While the imaging optical system is zooming from the wide-angle end toward the telephoto end during a shooting session, the first lens group G1 moves to draw a locus that is convex toward the image. The plurality of lenses that form the second lens group L2 and the aperture stop A1 together move toward the object. The third lens group G3 moves toward the object. The fourth lens group G4 also moves toward the object. In addition, as the imaging optical system is zooming, the respective lens groups move along the optical axis such that the interval between the first lens group G1 and the second lens group G2 decreases, the interval between the second lens group G2 and the third lens group G3 decreases from the wide-angle end through an intermediate position but increases from the intermediate position through the telephoto end, and the interval between the third lens group G3 and the fourth lens group G4 increases.

While the imaging optical system is focusing from the infinity focus point toward the close focus point, the third lens group G3 moves along the optical axis toward the image plane S.

Conditions and Effects

Next, conditions for implementing the imaging optical systems according to the first to fourth embodiments, for example, will be described. That is to say, a plurality of possible conditions are defined for the imaging optical system according to each of these four embodiments. In that case, an imaging optical system, of which the configuration satisfies all of these possible conditions, is most advantageous. Alternatively, an imaging optical system that achieves its expected advantages by satisfying the individual conditions to be described below may also be obtained.

For example, as in the imaging optical system according to the first to fourth embodiments described above, an imaging optical system according to the present disclosure includes: a first lens group G1 having negative power; a second lens group G2 having positive power; a third lens group G3 having negative power; and a fourth lens group G4 having power. While the imaging optical system is zooming from a wide-angle end toward a telephoto end during a shooting session, intervals between the plurality of lens groups change. The first lens group G1 includes: a first negative lens (first lens L1); a second negative lens (second lens L2); and a meniscus lens having negative power and having a convex surface facing the image (third lens L3). The first, second, and third negative lenses are arranged in this order such that the first negative lens is located closer to the object than any other negative lens and that the third negative lens is located closer to the image than any other negative lens. The third lens group G3 is made up of two lenses. While the imaging optical system is focusing from an infinity focus point toward a close focus point, the third lens group G3 moves along an optical axis. This allows an average refractive angle of a light beam incident on the third lens group G3 to be decreased. This provides an imaging optical system which may compensate for various types of aberrations sufficiently while reducing a variation in the angle of view during focusing, even though the imaging optical system is implemented as a wide-angle zoom lens of a small size.

In addition, in the imaging optical system, the second negative lens is suitably a meniscus lens with a convex surface facing the object. This allows the refractive angle of a light beam incident on the second negative lens to be decreased, thus reducing various types of aberrations (e.g., the field curvature, in particular).

Furthermore, in the imaging optical system, the first lens group G1 suitably includes: a first negative lens; a second negative lens; and a third negative lens with a convex surface facing the image (third lens L3). The first, second, and third negative lenses are arranged in this order such that the first negative lens is located closer to the object than any other negative lens and that the third negative lens is located closer to the image than any other negative lens. The third negative lens suitably satisfies a condition expressed by the following Inequality (1):

$$0.05 < R1\_L1c/R2\_L1c < 0.8 \qquad (1)$$

where $R1\_L1c$ is a radius of curvature of a surface facing the object of the third negative lens and $R2\_L1c$ is a radius of curvature of a surface facing the image of the third negative lens.

The condition expressed by this Inequality (1) defines the ratio of radii of curvature of the third negative lens. If the ratio were less than the lower limit defined by this Inequality (1), then it would be difficult to compensate for a spherical aberration. Conversely, if the ratio were greater than the upper limit defined by this Inequality (1), then a material with a high refractive index should be used as material for the negative lens, thus making it difficult to compensate for a chromatic aberration of magnification and an axial chromatic aberration.

To enhance the advantage described above, at least one of the conditions expressed by the following Inequalities (1a) and (1b) is suitably satisfied:

$$0.2 < R1\_L1c/R2\_L1c \qquad (1a)$$

$$R1\_L1c/R2\_L1c < 0.6 \qquad (1b)$$

More suitably, to further enhance the advantage described above, at least one of the conditions expressed by the following Inequalities (1c) and (1d) may be satisfied:

$$0.4 < R1\_L1c/R2\_L1c \qquad (1c)$$

$$R1\_L1c/R2\_L1c < 0.5 \qquad (1d)$$

Also, for example, the second lens group G2 may include: a front lens group having positive power; an aperture stop A1; and a rear lens group having negative power. The front lens group, the aperture stop, and the rear lens group are arranged in this order such that the front lens group is located closer to the object than the aperture stop A1 or the rear lens group and that the rear lens group is located closer to the image than the front lens group or the aperture stop. The rear lens group having negative power may include at least one positive lens (hereinafter referred to as a "positive rear lens"). The positive rear lens suitably satisfies a condition expressed by the following Inequality (2). More suitably, the positive rear lens satisfies a condition expressed by the following Inequality (2'):

$$65 < v\_LG2Rp \tag{2}$$

$$v\_LG2Rp < 95 \tag{2'}$$

where $v\_LG2Rp$ is an abbe number with respect to a d-line of the positive rear lens.

The conditions expressed by these inequalities (2) and (2') define the abbe number of the positive rear lens in the rear lens group having negative power. If the abbe number were less than the lower limit defined by this Inequality (2), then it would be difficult to compensate for an axial chromatic aberration. Conversely, if the abbe number were greater than the upper limit defined by this Inequality (2'), then a material with a low refractive index should be used as material for the lens having positive power, thus making it difficult to compensate for a spherical curvature.

To enhance the advantage described above, at least one of the conditions expressed by the following Inequalities (2a) and (2b) is suitably satisfied:

$$75 < v\_LG2Rp \tag{2a}$$

$$v\_LG2Rp < 90 \tag{2b}$$

More suitably, to further enhance the advantage described above, at least one of the conditions expressed by the following Inequalities (2c) and (2d) may be satisfied:

$$80 < v\_LG2Rp \tag{2c}$$

$$v\_LG2Rp < 85 \tag{2d}$$

Furthermore, for example, the fourth lens group G4 includes at least one lens. The fourth lens group G4 suitably includes, as a lens located closest to the image in the at least one lens, a negative lens (hereinafter referred to as a "first particular lens") that satisfies a condition expressed by the following Inequality (3):

$$1.8 < n\_LG4Rn \tag{3}$$

where $n\_LG4Rn$ is a refractive index with respect to a d-line of the first particular lens.

The condition expressed by this Inequality (3) defines a refractive index with respect to a d-line of the first particular lens. If the refractive index were less than the lower limit defined by this Inequality (3), then it would be difficult to compensate for the spherical aberration and field curvature.

To enhance the advantage described above, the condition expressed by the following Inequality (3a) is suitably satisfied:

$$1.85 < n\_LG4Rn \tag{3a}$$

More suitably, to further enhance the advantage described above, the condition expressed by the following Inequality (3b) may be satisfied:

$$1.91 < n\_LG4Rn \tag{3b}$$

Furthermore, for example, in the imaging optical system, the third lens group G3 may include at least one positive lens (hereinafter referred to as a "second particular lens"), and the second particular lens suitably satisfies a condition expressed by the following Inequality (4):

$$14 < v\_LG3p < 35 \tag{4}$$

where $v\_LG3p$ is an abbe number with respect to a d-line of the second particular lens.

The condition expressed by this Inequality (4) defines an abbe number with respect to a d-line of the second particular lens. If the abbe number were less than the lower limit defined by this Inequality (4), then it would be difficult to compensate for an axial chromatic aberration and a chromatic aberration of magnification. Conversely, if the abbe number were greater than the upper limit defined by this Inequality (4), then it would be difficult to compensate for the spherical aberration and field curvature.

To enhance the advantage described above, at least one of the conditions expressed by the following Inequalities (4a) and (4b) is suitably satisfied:

$$16 < v\_LG3p \tag{4a}$$

$$v\_LG3p < 30 \tag{4b}$$

More suitably, to further enhance the advantage described above, at least one of the conditions expressed by the following Inequalities (4c) and (4d) may be satisfied:

$$17 < v\_LG3p \tag{4c}$$

$$v\_LG3p < 25 \tag{4d}$$

(Schematic Configuration for Image Capture Device to which First Embodiment is Applied)

Figure 9:
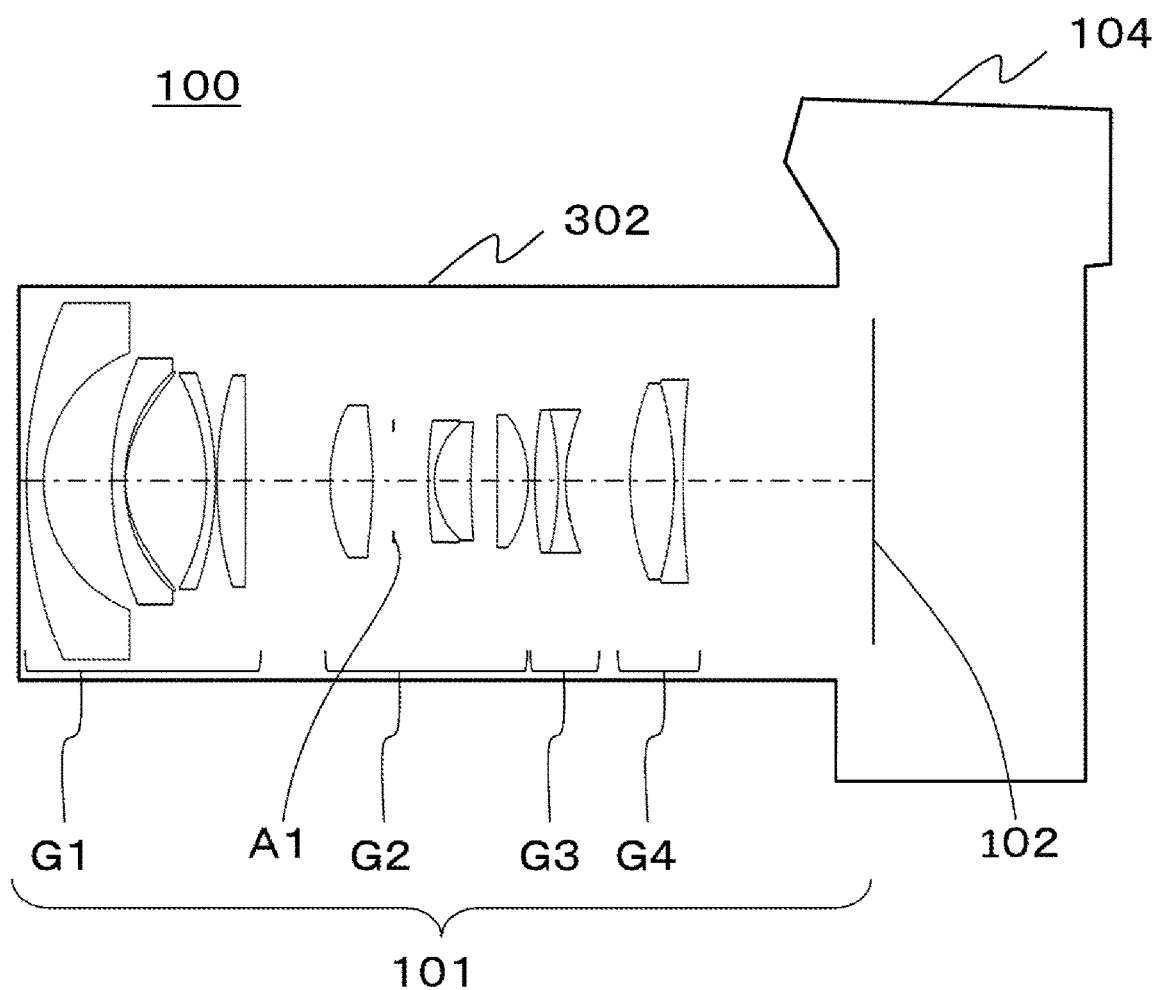
FIG. 9 illustrates a schematic configuration for a digital camera according to the first embodiment.

FIG. 9 illustrates a schematic configuration for an image capture device 100, to which the imaging optical system 101 of the first embodiment is applied. Optionally, the imaging optical system according to the second, third, or fourth embodiment is also applicable to the image capture device 100.

The image capture device 100 transforms an optical image of an object into an electrical image signal and displays and/or stores the image signal thus transformed. The image capture device 100 includes a housing 104, an image sensor 102, and the imaging optical system 101. The imaging optical system 101 forms an optical image of the object. The image sensor 102 transforms the optical image of the object, formed by the imaging optical system 101, into an electrical image signal. The housing 104 houses the image sensor 102 and the imaging optical system 101. The image capture device 100 may be implemented as a digital camera, for example.

The imaging optical system 101 includes the first lens group G1, the second lens group G2, the third lens group G3, and the fourth lens group G4.

The second lens group G2 includes the aperture stop A1.

The housing 104 includes a lens barrel 302. The lens barrel 302 holds the respective lens groups and the aperture stop A1 that form the imaging optical system 101.

The image sensor 102 is arranged at the image plane S of the imaging optical system 101 according to the first embodiment.

In addition, an actuator, a lens frame, and other members housed in the housing 104 are arranged with respect to the imaging optical system 101 such that the intervals between the first lens group G1, the second lens group G2, the third lens group G3, and the fourth lens group G4 change while the imaging optical system 101 is zooming.

This provides an image capture device 100 in which various types of aberrations have been compensated for sufficiently.

In the example described above, the imaging optical system 101 according to the first embodiment is applied to a digital camera. However, this is only an example and should not be construed as limiting. Alternatively, the imaging optical system 101 is also applicable to a surveillance camera, a smartphone. and various other types of image capture devices.

Schematic Configuration for Camera System to which First Embodiment is Applied

Figure 10:
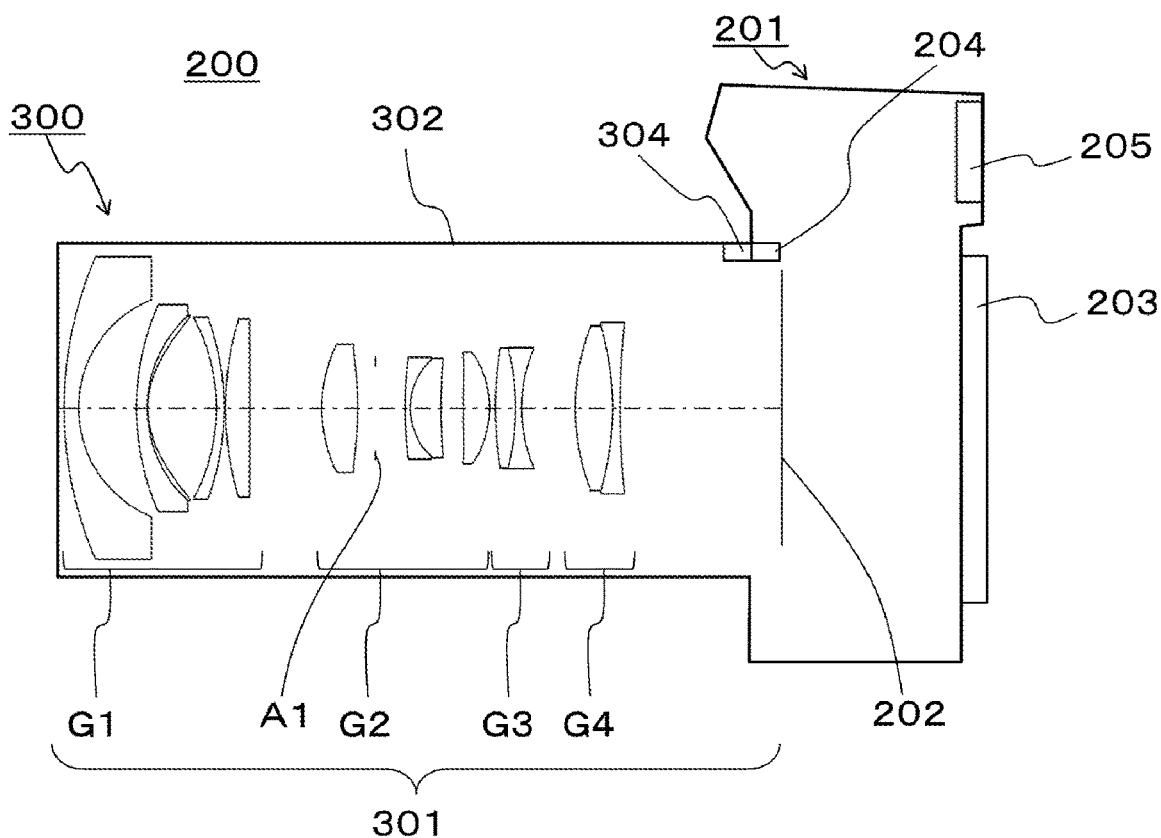
FIG. 10 illustrates a schematic configuration for a lens interchangeable digital camera according to the first embodiment.

FIG. 10 illustrates a schematic configuration for a camera system 200, to which the imaging optical system 301 of the first embodiment is applied. Optionally, the imaging optical system according to the second, third, or fourth embodiment is also applicable to the camera system 200.

The camera system 200 includes a camera body 201 and an interchangeable lens unit 300 to be connected removably to the camera body 201.

The camera body 201 includes an image sensor 202, a monitor 203, a memory, a camera mount 204, and a viewfinder 205. The image sensor 202 receives an optical image formed by the imaging optical system of the interchangeable lens unit 300 and transforms the optical image into an electrical image signal. The monitor 203 displays the image signal transformed by the image sensor 202. The memory stores an image signal.

The interchangeable lens unit 300 includes the imaging optical system 301. Specifically, the interchangeable lens unit 300 includes the first lens group G1, the second lens group G2, the third lens group G3, and the fourth lens group G4. The interchangeable lens unit 300 forms an optical image of the object on the image sensor 202.

The second lens group G2 includes the aperture stop A1.

The interchangeable lens unit 300 includes a lens barrel 302. The lens barrel 302 holds the lenses of the respective lens groups and aperture stop A1 of the imaging optical system 301. The lens barrel 302 further includes a lens mount 304 to be connected to the camera mount 204 of the camera body 201.

The camera body 201 is to be connected removably to the interchangeable lens unit 300 via the camera mount 204. That is to say, connecting the camera mount 204 to the lens mount 304 of the interchangeable lens unit 300 allows the camera body 201 to be connected to the interchangeable lens unit 300. Also, removing the camera mount 204 from the lens mount 304 of the interchangeable lens unit 300 allows the camera body 201 to be separated from the interchangeable lens unit 300.

In this manner, the camera mount 204 and the lens mount 304 not only are physically connected together but also electrically connect together a controller in the camera body 201 and a controller in the interchangeable lens unit 300. That is to say, the camera mount 204 and the lens mount 304 serve as interfaces that allow the camera mount 204 and the lens mount 304 to exchange signals with each other.

The camera system 200 includes at least the respective lens groups held by the lens barrel 302 and the camera body 201. In addition, the camera system 200 further includes an actuator, a lens frame, and other members to be controlled by the controller in the interchangeable lens unit 300 such that the intervals between the first lens group G1, the second lens group G2, the third lens group G3, and the fourth lens group G4 of the imaging optical system 301 change while the imaging optical system 301 is zooming.

Other Embodiments

The first, second, third, and fourth embodiments have been described as exemplary embodiments of the present disclosure. Note that the embodiments described above are only examples of the present disclosure and should not be construed as limiting. Rather, each of those embodiments may be readily modified, replaced, combined with other embodiments, provided with some additional components, or partially omitted without departing from the scope of the present disclosure.

For example, in the first to fourth embodiments described above, the imaging optical system is supposed to be used in the entire zoom range. However, the imaging optical system does not have to be used in the entire zoom range. Alternatively, the imaging optical system may also be used selectively only in an extracted range where optical performance is ensured according to the desired zoom range. That is to say, the imaging optical system may also be used as an imaging optical system with lower zoom power than the imaging optical system to be described for the first, second, third, and fourth examples of numerical values. Optionally, the imaging optical system may also be used selectively as single-focus imaging optical system only at an extracted focal length where optical performance is ensured according to the desired zoom position.

Furthermore, in the second to fourth embodiments described above, each of the lens groups that form the imaging optical system is supposed to consist of only refractive lenses that deflect the incoming light ray through refraction (i.e., lenses of the type that deflect the incoming light ray at the interface between two media with mutually different refractive indices). However, this is only an example and should not be construed as limiting. Alternatively, each lens group may also include diffractive lenses that deflect the incoming light ray through diffraction, compound aspheric lenses as a combination of a glass lens and a resin layer with an aspheric shape such as the second lens L2 according to the first embodiment, or refractive index distributed lenses that deflect the incoming light ray in accordance with the distribution of refractive indices in the medium. Among other things, a diffraction structure is suitably formed at the interface between two media with mutually different refractive indices in the refractive-diffractive hybrid lens, because the diffraction efficiency would depend on the wavelength much less heavily in that case. This provides a camera system in which various types of aberrations have been compensated for sufficiently.

Examples of Numerical Values

Next, exemplary sets of specific numerical values that were actually adopted in the imaging optical systems with the configurations according to the first, second, third, and fourth embodiments will be described. Note that in the tables showing these exemplary sets of numerical values, the length is expressed in millimeters (mm), the angle of view is expressed in degrees (°), r indicates the radius of curvature, d indicates the surface interval, nd indicates a refractive index with respect to a d-line, υd (also denoted as "vd") indicates an abbe number with respect to a d-line, and a surface with an asterisk (*) is an aspheric surface. The aspheric shape is defined by the following Equation (1).

Furthermore, in the exemplary sets of numerical values, the aperture diameter refers to an effective open aperture diameter at each zoom position:

$$Z = \frac{h^2/r}{1+\sqrt{1-(1+\kappa)(h/r)^2}} + \Sigma A_n h^n$$

where Z is the distance from a point on an aspheric surface, located at a height h measured from the optical axis, to a tangent plane defined with respect to the vertex of the aspheric surface, h is the height as measured from the optical axis, r is the radius of curvature of the vertex, κ is a conic constant, and An is an $n^{th}$ order aspheric surface coefficient.

FIGS. 2, 4, 6, and 8 are longitudinal aberration diagrams showing what state the imaging optical systems according to the first, second, third, and fourth embodiments assume at the infinity focus point.

In each longitudinal aberration diagram, portion (a) shows the longitudinal aberrations at the wide-angle end, portion (b) shows the longitudinal aberrations at the intermediate position, and portion (c) shows the longitudinal aberrations at the telephoto end. Each of portions (a), (b) and (c) of these longitudinal aberration diagrams shows spherical aberration (SA (mm)), astigmatism (AST (mm)), and distortion (DIS (%)) in this order from left to right. In each spherical aberration diagram, the ordinate indicates the F number (designated by "F" on the drawings), the solid curve indicates a characteristic in response to a d-line, the shorter dashed curve indicates a characteristic in response to an F-line, and the longer dashed curve indicates a characteristic in response to a C-line. In each astigmatism diagram, the ordinate indicates the image height (designated by "H" on the drawings), the solid curve indicates a characteristic with respect to a sagittal plane (designated by "s" on the drawings), and the dotted curve indicates a characteristic with respect to a meridional plane (designated by "m" on the drawings). Furthermore, in each distortion diagram, the ordinate indicates the image height (designated by "H" on the drawings).

First Example of Numerical Values

Figure 2:
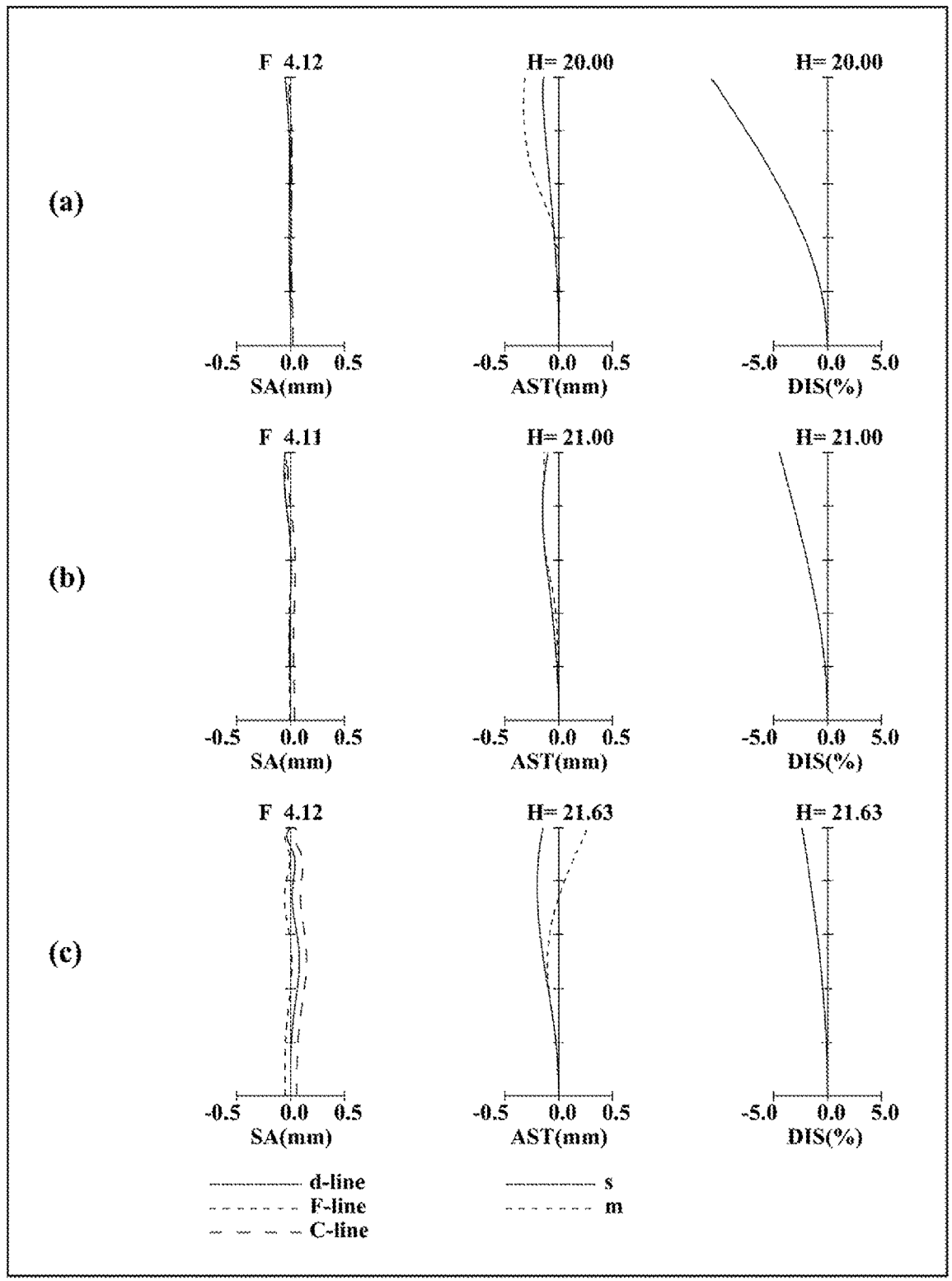
FIG. 2 illustrates longitudinal aberration diagrams showing what state the imaging optical system assumes at the infinity focus point in the first example of numerical values.

Following is a first exemplary set of numerical values for the imaging optical system corresponding to the first embodiment shown in FIGS. 1 and 2. Specifically, as the first example of numerical values for the imaging optical system, surface data is shown in Table 1, aspheric surface data is shown in Table 2, and various types of data at the infinity focus point are shown in Tables 3A-3D. d9, d17, and d20 each indicate the interval between two adjacent lens groups (see FIG. 1).

TABLE 1

Surface data

| Surface No. | r | d | nd | vd |
|---|---|---|---|---|
| Object surface | ∞ | | | |
| 1 | 61.30310 | 2.30000 | 1.69144 | 53.6 |
| 2 | 18.88490 | 9.30000 | | |
| 3 | 41.15000 | 1.75000 | 1.71181 | 52.5 |
| 4 | 20.27860 | 0.07000 | 1.51122 | 59.6 |
| 5* | 14.43700 | 11.04000 | | |
| 6 | −30.46170 | 1.20000 | 1.48749 | 70.4 |
| 7 | −42.83070 | 0.23000 | | |
| 8 | 49.24800 | 3.90000 | 1.72960 | 26.2 |

TABLE 1-continued

Surface data

| Surface No. | r | d | nd | vd |
|---|---|---|---|---|
| 9 | −2541.07380 | Variable | | |
| 10* | 22.90210 | 5.80000 | 1.57469 | 56.0 |
| 11* | −51.31830 | 2.83000 | | |
| 12 (aperture) | ∞ | 4.75000 | | |
| 13 | 64.06090 | 0.80000 | 1.90698 | 30.3 |
| 14 | 10.55530 | 5.00000 | 1.49700 | 81.6 |
| 15 | 96.12580 | 3.55000 | | |
| 16* | 269.41210 | 4.20000 | 1.58133 | 46.5 |
| 17* | −16.90070 | Variable | | |
| 18 | 57.29830 | 3.25000 | 1.84666 | 23.8 |
| 19 | −39.69610 | 1.00000 | 1.81040 | 33.1 |
| 20 | 24.86950 | Variable | | |
| 21 | 35.85280 | 6.00000 | 1.48749 | 70.4 |
| 22 | −47.91560 | 1.20000 | 1.91082 | 35.2 |
| 23 | 132.45750 | BF | | |
| Image plane | ∞ | | | |

TABLE 2

Aspheric surface data $5^{th}$ surface

K = −8.60744E−01, A4 = −1.09058E−05, A6 = −3.39948E−08,
A8 = −7.35568E−11 A10 = 1.89948E−13, A12 = −8.19926E−16,
A14 = 0.00000E+00

$10^{th}$ surface

K = 0.00000E+00, A4 = −1.01233E−05, A6 = −8.60053E−08,
A8 = 2.86697E−09 A10 = −2.94258E−11, A12 = 1.68258E−13,
A14 = 0.00000E+00

$11^{th}$ surface

K = 0.00000E+00, A4 = 1.58943E−05, A6 = 2.92108E−08,
A8 = −5.38824E−10 A10 = 3.70371E−11, A12 = −4.51108E−13,
A14 = 2.42691E−15

$16^{th}$ surface

K = 0.00000E+00, A4 = −2.35150E−05, A6 = 1.19948E−07,
A8 = −3.24297E−09 A10 = 1.40767E−11, A12 = 2.15242E−13,
A14 = −2.59066E−15

$17^{th}$ surface

K = 0.00000E+00, A4 = −1.50992E−05, A6 = −8.96894E−08,
A8 = −2.74366E−09 A10 = 2.94693E−11, A12 = −3.11976E−13,
A14 = 0.00000E+00

Various Types of Data at Infinity Focus Point

TABLE 3A

Various types of data
Zoom ratio: 2.04660

| | Wide | Middle | Tele |
|---|---|---|---|
| Focal length | 16.5534 | 24.1174 | 33.8782 |
| F number | 4.12005 | 4.10925 | 4.12028 |
| Angle of view | 53.5677 | 42.3525 | 33.1898 |
| Image height | 20.0000 | 21.0000 | 21.6330 |
| Total lens length | 122.3559 | 115.3042 | 118.0974 |
| BF | 17.50941 | 25.97712 | 37.66432 |
| d9 | 27.6237 | 11.5454 | 1.9767 |
| d17 | 1.0000 | 0.9291 | 0.1511 |
| d20 | 8.0528 | 8.6826 | 10.1353 |
| Entrance pupil position | 20.7261 | 19.0009 | 17.5676 |
| Exit pupil position | −27.7570 | −28.2502 | −29.1643 |
| Anterior principal point | 31.2261 | 32.3922 | 34.2715 |
| Posterior principal point | 105.8025 | 91.1869 | 84.2193 |

TABLE 3B

Data about single lens

| Lens | Start surface | Focal length |
|---|---|---|
| 1 | 1 | −40.3670 |
| 2 | 3 | −58.1978 |
| 3 | 4 | −98.4319 |
| 4 | 6 | −223.4817 |
| 5 | 8 | 66.2587 |
| 6 | 10 | 28.3634 |
| 7 | 13 | −14.0335 |
| 8 | 14 | 23.4039 |
| 9 | 16 | 27.5046 |
| 10 | 18 | 28.1291 |
| 11 | 19 | −18.7375 |
| 12 | 21 | 43.0795 |
| 13 | 22 | −38.5099 |

TABLE 3C

Data about zoom lens groups

| Group | Start surface | Focal length | Lens configuration length | Anterior principal point | Posterior principal point |
|---|---|---|---|---|---|
| 1 | 1 | −26.85740 | 29.79000 | 1.84601 | 1.76778 |
| 2 | 10 | 29.71996 | 26.93000 | 15.77166 | 10.40926 |
| 3 | 18 | −63.32840 | 4.25000 | 4.66809 | 6.44489 |
| 4 | 21 | −813.00731 | 7.20000 | 55.15937 | 54.46837 |

TABLE 3D

Zoom powers of zoom lens groups

| Group | Start surface | Wide | Middle | Tele |
|---|---|---|---|---|
| 1 | 1 | 0.00000 | 0.00000 | 0.00000 |
| 2 | 10 | −0.43352 | −0.56635 | −0.69264 |
| 3 | 18 | 1.47574 | 1.62821 | 1.84292 |
| 4 | 21 | 0.96340 | 0.97381 | 0.98819 |

Second Example of Numerical Values

Figure 4:
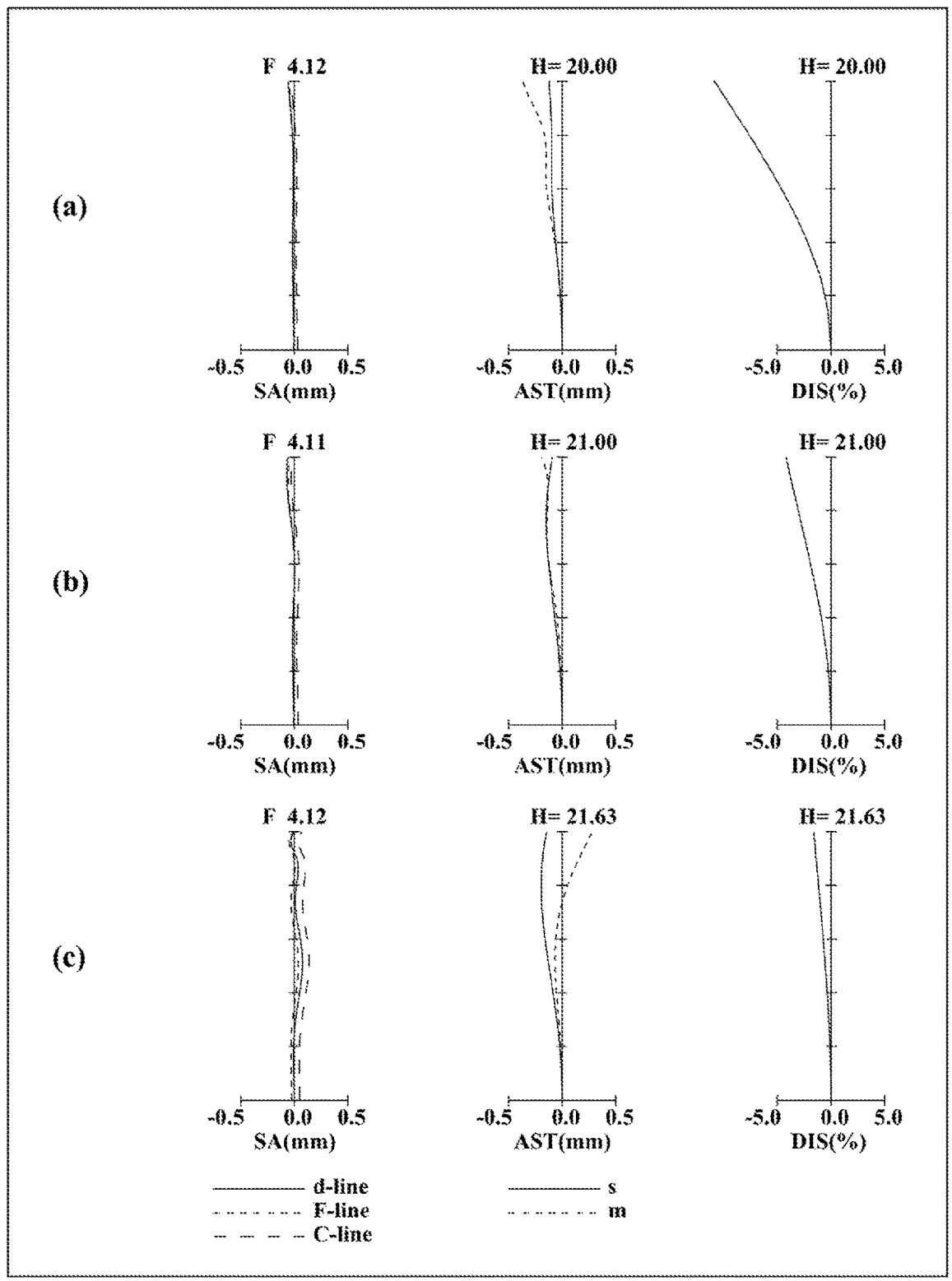
FIG. 4 illustrates longitudinal aberration diagrams showing what state the imaging optical system assumes at the infinity focus point in the second example of numerical values.

Following is a second exemplary set of numerical values for the imaging optical system corresponding to the second embodiment shown in FIGS. 3 and 4. Specifically, as the second example of numerical values for the imaging optical system, surface data is shown in Table 4, aspheric surface data is shown in Table 5, and various types of data at the infinity focus point are shown in Tables 6A-6D. d8, d17, and d20 each indicate the interval between two adjacent lens groups (see FIG. 3).

TABLE 4

Surface data

| Surface No. | r | d | nd | vd |
|---|---|---|---|---|
| Object surface | ∞ | | | |
| 1 | 61.36080 | 2.30000 | 1.73211 | 51.4 |
| 2 | 20.21040 | 9.30000 | | |
| 3 | 32.99360 | 1.75000 | 1.69350 | 53.2 |
| 4* | 15.02310 | 11.54230 | | |
| 5 | −34.80090 | 1.20000 | 1.48749 | 70.4 |
| 6 | −77.93000 | 0.23000 | | |
| 7 | 55.96520 | 3.90000 | 1.81442 | 28.7 |
| 8 | −391.78130 | Variable | | |
| 9 | ∞ | 0.00000 | | |
| 10* | 21.76050 | 5.80000 | 1.58313 | 59.5 |
| 11* | −51.51400 | 2.83000 | | |
| 12 (aperture) | ∞ | 4.75000 | | |
| 13 | 106.42610 | 0.80000 | 1.88918 | |
| 14 | 11.24310 | 5.00000 | 1.45650 | 90.3 |
| 15 | 110.23880 | 3.55000 | | |
| 16* | 201.24730 | 4.20000 | 1.58313 | 59.5 |
| 17* | −18.04810 | Variable | | |
| 18 | 54.05760 | 3.25000 | 1.84666 | 23.8 |
| 19 | −47.98780 | 1.00000 | 1.79760 | 32.7 |
| 20 | 26.25620 | Variable | | |
| 21 | 49.09860 | 6.00000 | 1.48749 | 70.4 |
| 22 | −49.84570 | 1.20000 | 1.91082 | 35.2 |
| 23 | 290.52440 | BF | | |
| Image plane | ∞ | | | |

TABLE 5

Aspheric surface data $4^{th}$ surface

K = −6.62672E−01, A4 = −4.85018E−06, A6 = −1.57316E−08,
A8 = −1.73943E−11 A10 = −7.96227E−14, A12 = −2.66404E−16,
A14 = 0.00000E+00

$10^{th}$ surface

K = 0.00000E+00, A4 = −7.80041E−06, A6 = −4.95898E−08,
A8 = 2.80819E−09 A10 = −3.03672E−11, A12 = 2.00667E−13,
A14 = 0.00000E+00

$11^{th}$ surface

K= 0.00000E+00, A4 = 1.97685E−05, A6 = 7.68505E−08,
A8 =−2.12196E−09 A10 = 7.97474E−11, A12 = −9.23597E−13,
A14 = 4.62551E−15

$16^{th}$ surface

K = 0.00000E+00, A4 = −1.80577E−05, A6 = −2.96295E−08,
A8 = 8.34680E−10 A10 = −2.49845E−11, A12 = 2.72120E−13,
A14 = −1.27452E−15

$17^{th}$ surface

K = 0.00000E+00, A4 = −1.34366E−05, A6 = −1.29693E−07,
A8 = −6.12064E−10 A10 = 2.97024E−12, A12 = −1.00392E−13,
A14 = 0.00000E+00

Various Types of Data at Infinity Focus Point

TABLE 6A

Various types of data
Zoom ratio: 2.04660

| | Wide | Middle | Tele |
|---|---|---|---|
| Focal length | 16.5535 | 23.4446 | 33.8784 |
| F number | 4.12043 | 4.10949 | 4.12027 |
| Angle of view | 53.5671 | 43.0630 | 32.9759 |
| Image height | 20.0000 | 21.0000 | 21.6330 |
| Total lens length | 125.2774 | 117.6844 | 118.2830 |
| BF | 17.50960 | 25.97727 | 37.66455 |
| d8 | 30.5709 | 14.7379 | 2.8685 |
| d17 | 1.4035 | 1.0200 | 0.7500 |
| d20 | 7.1911 | 7.3469 | 8.3977 |
| Entrance pupil position | 21.7685 | 20.0953 | 18.3182 |
| Exit pupil position | −28.7924 | −28.7619 | −29.5415 |
| Anterior principal point | 32.4040 | 33.4987 | 35.1185 |
| Posterior principal point | 108.7239 | 94.2398 | 84.4047 |

TABLE 6B

Data about single lens

| Lens | Start surface | Focal length |
|---|---|---|
| 1 | 1 | −42.1599 |
| 2 | 3 | −41.4244 |
| 3 | 5 | −130.1780 |
| 4 | 7 | 60.3645 |
| 5 | 10 | 27.0226 |
| 6 | 13 | −14.1940 |
| 7 | 14 | 26.9986 |
| 8 | 16 | 28.6050 |
| 9 | 18 | 30.4699 |
| 10 | 19 | −21.1507 |
| 11 | 21 | 51.7677 |
| 12 | 22 | −46.6333 |

TABLE 6C

Data about zoom lens groups

| Group | Start surface | Focal length | Lens configuration length | Anterior principal point | Posterior principal point |
|---|---|---|---|---|---|
| 1 | 1 | −27.91775 | 30.22230 | 2.12816 | 2.55010 |
| 2 | 9 | 31.20106 | 26.93000 | 14.68938 | 9.16925 |
| 3 | 18 | −79.34889 | 4.25000 | 5.43795 | 7.17245 |
| 4 | 21 | −813.02109 | 7.20000 | 39.78868 | 40.66764 |

TABLE 6D

Zoom powers of zoom lens groups

| Group | Start surface | Wide | Middle | Tele |
|---|---|---|---|---|
| 1 | 1 | 0.00000 | 0.00000 | 0.00000 |
| 2 | 9 | −0.44797 | −0.57977 | −0.74383 |
| 3 | 18 | 1.35010 | 1.46192 | 1.62306 |
| 4 | 21 | 0.98037 | 0.99079 | 1.00516 |

Third Example of Numerical Values

Figure 6:
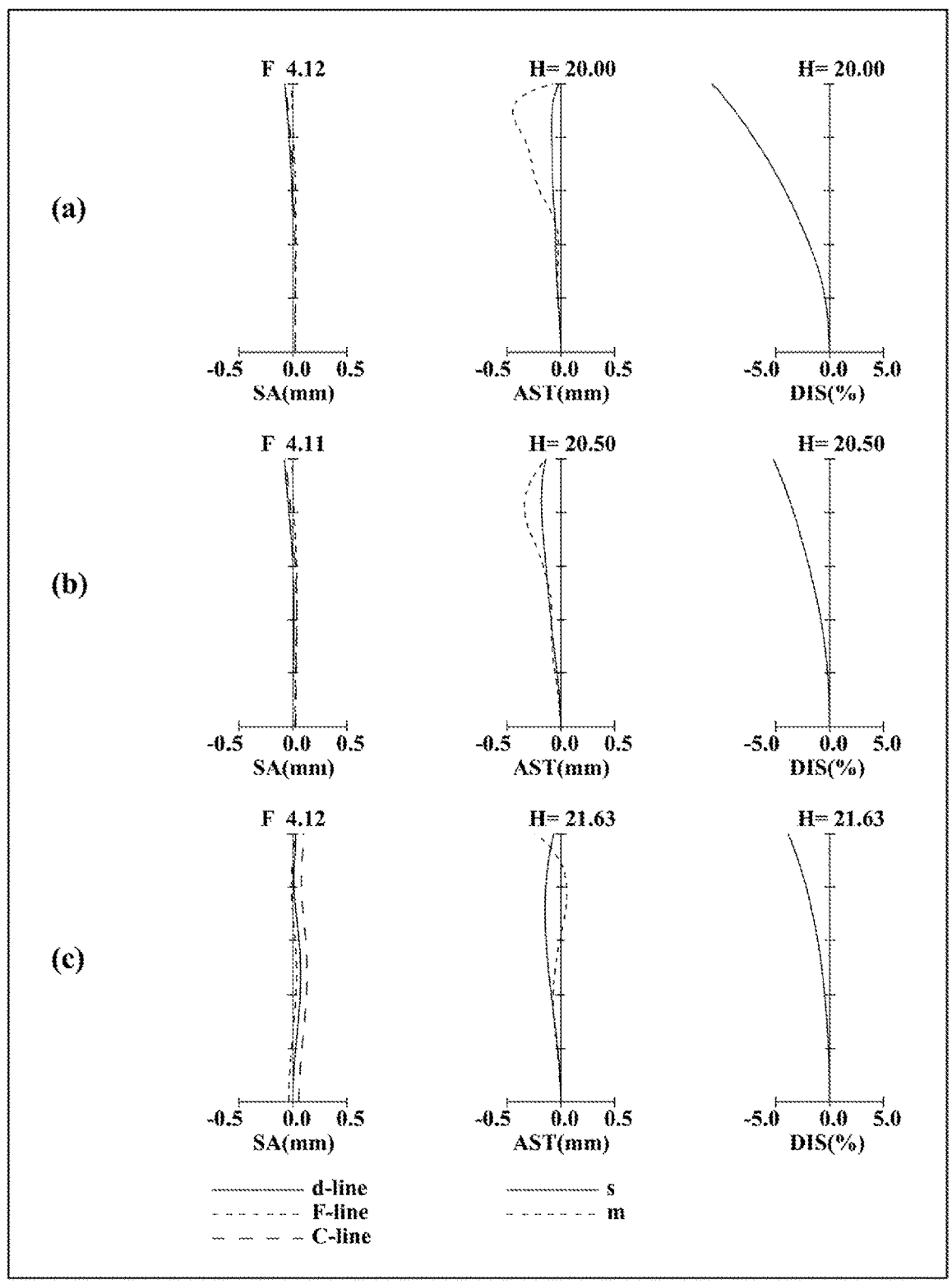
FIG. 6 illustrates longitudinal aberration diagrams showing what state the imaging optical system assumes at the infinity focus point in the third example of numerical values.

Following is a third exemplary set of numerical values for the imaging optical system corresponding to the third embodiment shown in FIGS. 5 and 6. Specifically, as the third example of numerical values for the imaging optical system, surface data is shown in Table 7, aspheric surface data is shown in Table 8, and various types of data at the infinity focus point are shown in Tables 9A-9D. d8, d17, and d20 each indicate the interval between two adjacent lens groups (see FIG. 5).

TABLE 7

Surface data

| Surface No. | r | d | nd | vd |
|---|---|---|---|---|
| Object surface | ∞ | | | |
| 1 | 43.55380 | 2.50000 | 1.77497 | 49.6 |
| 2 | 19.95370 | 4.86980 | | |
| 3 | 31.25770 | 2.60000 | 1.59387 | 61.1 |
| 4* | 12.44090 | 12.99230 | | |
| 5 | −29.49750 | 1.51460 | 1.49700 | 81.6 |
| 6 | −410.12640 | 0.95380 | | |
| 7 | 65.01730 | 3.66390 | 1.87952 | 29.4 |
| 8 | −144.94070 | Variable | | |

TABLE 7-continued

Surface data

| Surface No. | r | d | nd | vd |
|---|---|---|---|---|
| 9 | 19.22580 | 0.85000 | 1.95375 | 32.3 |
| 10 | 12.50190 | 6.88370 | 1.70523 | 41.0 |
| 11* | −548.22890 | 3.57430 | | |
| 12 (aperture) | ∞ | 2.00000 | | |
| 13 | 50.57430 | 0.80000 | 1.90366 | 31.3 |
| 14 | 11.03950 | 4.40210 | 1.59283 | 68.6 |
| 15 | 82.32480 | 7.66270 | | |
| 16* | 35.89930 | 5.27380 | 1.52250 | 62.2 |
| 17* | −21.24610 | Variable | | |
| 18 | 79.83540 | 3.96610 | 1.92286 | 20.9 |
| 19 | −37.98500 | 0.80000 | 1.90366 | 31.3 |
| 20 | 22.20920 | Variable | | |
| 21 | 28.35840 | 6.45190 | 1.51742 | 52.1 |
| 22 | −66.05830 | 1.20000 | 2.00100 | 29.1 |
| 23 | 148.09760 | 0.00000 | | |
| 24 | ∞ | BF | | |
| Image plane | ∞ | | | |

TABLE 8

Aspheric surface data $4^{th}$ surface

K = −4.22185E−01, A4 = −1.87704E−05, A6 = 3.97883E−08, A8 = −1.36860E−09 A10 = 7.00329E−12, A12 = −2.05342E−14

$11^{th}$ surface

K = 0.00000E+00, A4 = 1.06752E−05, A6 = −4.94800E−08, A8 = 5.02457E−10 A10 = −3.90915E−12, A12 = −4.06204E−24

$16^{th}$ surface

K = 0.00000E+00, A4 = −2.00079E−05, A6 = −4.55351E−08, A8 = 4.52795E−10 A10 = −1.80063E−12, A12 = 0.00000E+00

$17^{th}$ surface

K = 0.00000E+00, A4 = 6.17489E−06, A6 = −9.32563E−08, A8 = 3.00285E−10 A10 = −1.52687E−12, A12 = 0.00000E+00

Various Types of Data at Infinity Focus Point

TABLE 9A

Various types of data
Zoom ratio: 2.04740

| | Wide | Middle | Tele |
|---|---|---|---|
| Focal length | 16.5645 | 22.3687 | 33.9142 |
| F number | 4.12335 | 4.11303 | 4.12447 |
| Angle of view | 53.5820 | 44.0413 | 33.5683 |
| Image height | 20.0000 | 20.5000 | 21.6330 |
| Total lens length | 117.8912 | 114.7592 | 120.8264 |
| BF | 16.42340 | 24.94933 | 37.78378 |
| d8 | 22.0155 | 11.3658 | 1.0000 |
| d17 | 1.9469 | 1.1930 | 0.5000 |
| d20 | 4.5464 | 4.2921 | 8.5836 |
| Entrance pupil position | 20.6147 | 19.5008 | 18.0449 |
| Exit pupil position | −27.2151 | −26.7401 | −31.4704 |
| Anterior principal point | 30.8916 | 32.1894 | 35.3511 |
| Posterior principal point | 101.3267 | 92.3905 | 86.9122 |

TABLE 9B

Data about single lens

| Lens | Start surface | Focal length |
|---|---|---|
| 1 | 1 | −49.8216 |
| 2 | 3 | −36.6883 |
| 3 | 5 | −64.0356 |
| 4 | 7 | 51.4520 |
| 5 | 9 | −39.9456 |
| 6 | 10 | 17.4205 |
| 7 | 13 | −15.7793 |
| 8 | 14 | 21.0225 |
| 9 | 16 | 26.3800 |
| 10 | 18 | 28.3482 |
| 11 | 19 | −15.4119 |
| 12 | 21 | 39.2606 |
| 13 | 22 | −45.5087 |

TABLE 9C

Data about zoom lens groups

| Group | Start surface | Focal length | Lens configuration length | Anterior principal point | Posterior principal point |
|---|---|---|---|---|---|
| 1 | 1 | −24.84394 | 29.09440 | 3.26791 | 4.48821 |
| 2 | 9 | 28.28092 | 31.44660 | 21.35059 | 12.94865 |
| 3 | 18 | −36.41760 | 4.76610 | 3.64040 | 5.81886 |
| 4 | 21 | 188.50216 | 7.65190 | −12.07254 | −8.27111 |

TABLE 9D

Zoom powers of zoom lens groups

| Group | Start surface | Wide | Middle | Tele |
|---|---|---|---|---|
| 1 | 1 | 0.00000 | 0.00000 | 0.00000 |
| 2 | 9 | −0.43822 | −0.52483 | −0.64984 |
| 3 | 18 | 1.83662 | 2.19049 | 2.93762 |
| 4 | 21 | 0.82840 | 0.78317 | 0.71509 |

Fourth Example of Numerical Values

Figure 8:
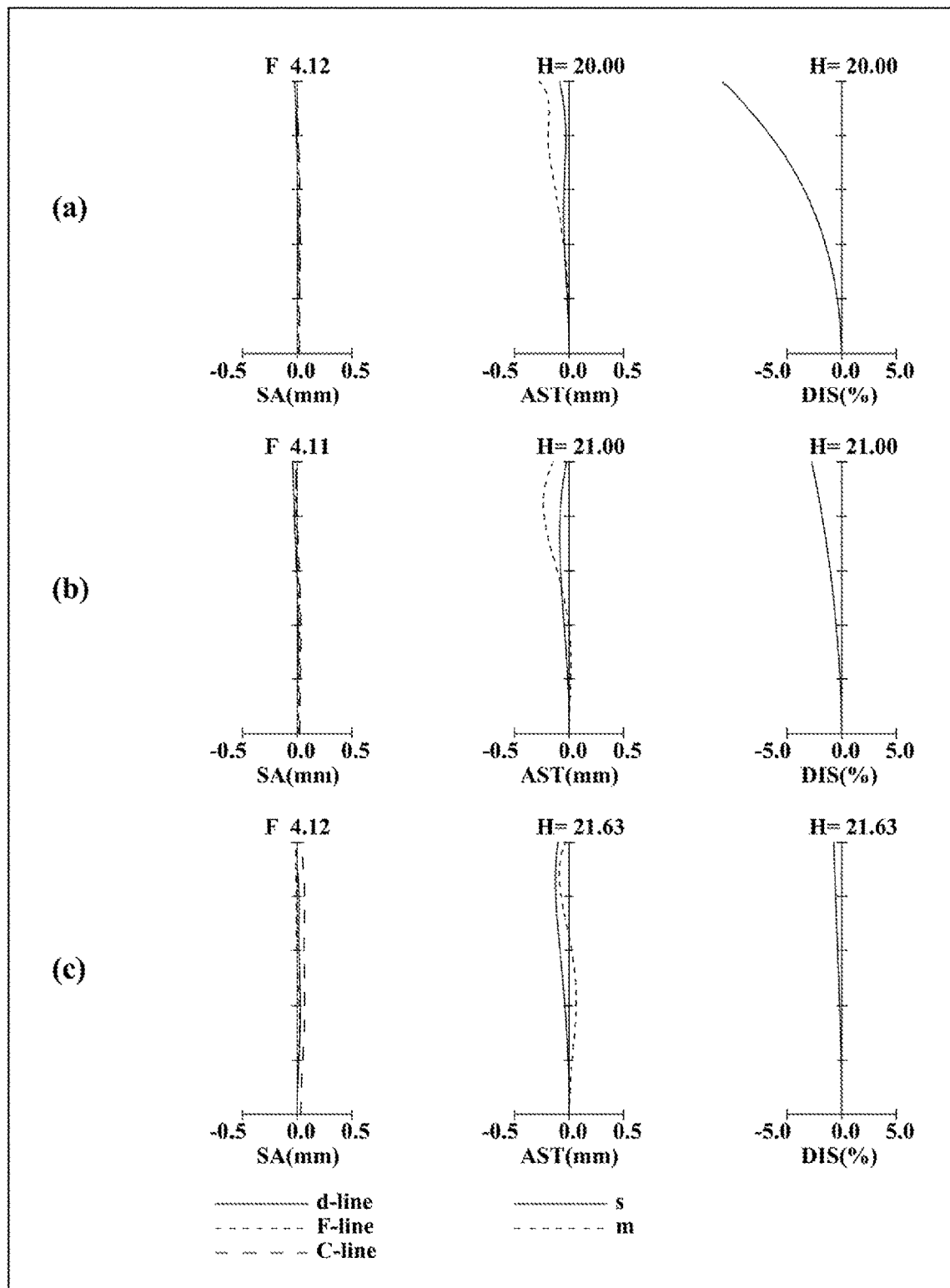
FIG. 8 illustrates longitudinal aberration diagrams showing what state the imaging optical system assumes at the infinity focus point in the fourth example of numerical values.

Following is a fourth exemplary set of numerical values for the imaging optical system corresponding to the fourth embodiment shown in FIGS. 7 and 8. Specifically, as the fourth example of numerical values for the imaging optical system, surface data is shown in Table 10, aspheric surface data is shown in Table 11, and various types of data at the infinity focus point are shown in Tables 12A-12D. d8, d16, and d19 each indicate the interval between two adjacent lens groups (see FIG. 7).

TABLE 10

Surface data

| Surface No. | r | d | nd | vd |
|---|---|---|---|---|
| Object surface | ∞ | | | |
| 1 | 78.85350 | 2.50000 | 1.77200 | 50.0 |
| 2* | 17.29520 | 4.88590 | | |
| 3 | 30.15520 | 2.60000 | 1.59349 | 67.0 |
| 4* | 17.04410 | 13.12020 | | |
| 5 | −36.34440 | 1.51460 | 1.49700 | 81.6 |
| 6 | −389.24000 | 1.10400 | | |
| 7 | 67.85670 | 4.12120 | 1.90007 | 31.6 |
| 8 | −196.54000 | Variable | | |
| 9* | 24.39890 | 5.75660 | 1.67731 | 51.2 |
| 10* | −80.57650 | 7.03970 | | |
| 11 (aperture) | ∞ | 2.00000 | | |
| 12 | 51.85170 | 0.80000 | 1.90534 | 28.5 |
| 13 | 9.90300 | 4.47650 | 1.55032 | 75.5 |
| 14 | 48.12540 | 3.87680 | | |
| 15* | 35.05930 | 3.84250 | 1.52250 | 62.2 |
| 16* | −22.71020 | Variable | | |
| 17 | 80.32400 | 3.96610 | 1.94595 | 18.0 |
| 18 | −29.74490 | 0.80000 | 1.91197 | 29.0 |
| 19 | 25.93380 | Variable | | |
| 20 | 93.13990 | 6.45190 | 1.51742 | 52.1 |
| 21 | −20.00270 | 0.57330 | | |
| 22 | −20.91850 | 1.20000 | 2.00100 | 29.1 |
| 23 | −48.47550 | BF | | |
| Image plane | ∞ | | | |

TABLE 11

Aspheric surface data $2^{nd}$ surface

K = −3.58267E−01, A4 = −9.15352E−06, A6 = −3.04869E−08, A8 = 5.17656E−11 A10 = −5.83730E−14, A12 = 0.00000E+00

$4^{th}$ surface

K = −6.81848E−01, A4 = 1.18647E−05, A6 = 6.02074E−08, A8 = −1.64779E−10 A10 = 3.41275E−13, A12 = −1.18051E−15

$9^{th}$ surface

K = 0.00000E+00, A4 = −1.59737E−05, A6 = 4.22899E−09, A8 = −1.12452E−09 A10 = 9.68970E−12, A12 = −5.21763E−14

$10^{th}$ surface

K = 0.00000E+00, A4 = −3.92901E−06, A6 = −5.04988E−09, A8 = −7.84222E−10 A10 = 6.21383E−12, A12 = −3.81477E−14

$15^{th}$ surface

K = 0.00000E+00, A4 = −2.67730E−05, A6 = −1.61366E−07, A8 = 1.37044E−09 A10 = −1.70621E−11, A12 = 0.00000E+00

$16^{th}$ surface

K = 0.00000E+00, A4 = −2.47175E−05, A6 = −3.01029E−07, A8 = 1.48213E−09 A10 = −2.91517E−11, A12 = 0.00000E+00

Various Types of Data at Infinity Focus Point

TABLE 12A

Various types of data
Zoom ratio: 2.18344

| | Wide | Middle | Tele |
|---|---|---|---|
| Focal length | 15.5281 | 22.9443 | 33.9047 |
| F number | 4.12286 | 4.11167 | 4.12323 |
| Angle of view | 55.3379 | 43.2568 | 32.7326 |
| Image height | 20.0000 | 21.0000 | 21.6330 |
| Total lens length | 124.6809 | 116.3088 | 118.3052 |
| BF | 16.41731 | 24.94077 | 37.76484 |
| d8 | 30.9559 | 13.0941 | 1.0000 |
| d16 | 0.5539 | 0.7541 | 0.9646 |
| d19 | 6.1245 | 6.8905 | 7.9465 |
| Entrance pupil position | 19.5962 | 18.1945 | 16.8479 |
| Exit pupil position | −27.1420 | −28.1875 | −29.6068 |
| Anterior principal point | 29.5889 | 31.2299 | 33.6901 |
| Posterior principal point | 109.1528 | 93.3645 | 84.4005 |

TABLE 12B

Data about single lens

| Lens | Start surface | Focal length |
|---|---|---|
| 1 | 1 | −29.2143 |
| 2 | 3 | −71.3188 |
| 3 | 5 | −80.7744 |
| 4 | 7 | 56.4583 |
| 5 | 9 | 28.2766 |
| 6 | 12 | −13.6443 |
| 7 | 13 | 21.7528 |
| 8 | 15 | 26.9940 |
| 9 | 17 | 23.3562 |
| 10 | 18 | −15.0884 |
| 11 | 20 | 32.4551 |
| 12 | 22 | −37.5795 |

TABLE 12C

Data about zoom lens groups

| Group | Start surface | Focal length | Lens configuration length | Anterior principal point | Posterior principal point |
|---|---|---|---|---|---|
| 1 | 1 | −25.80417 | 29.84590 | 0.35382 | 0.78954 |
| 2 | 9 | 29.45458 | 27.79210 | 14.23877 | 8.68738 |
| 3 | 17 | −47.08094 | 4.76610 | 3.95588 | 6.15011 |
| 4 | 20 | 203.31103 | 8.22520 | −1.16179 | 1.66835 |

TABLE 12D

Zoom powers of zoom lens groups

| Group | Start surface | Wide | Middle | Tele |
|---|---|---|---|---|
| 1 | 1 | 0.00000 | 0.00000 | 0.00000 |
| 2 | 9 | −0.41720 | −0.55850 | −0.72468 |
| 3 | 17 | 1.62615 | 1.88394 | 2.31854 |
| 4 | 20 | 0.88700 | 0.84508 | 0.78200 |

Values Corresponding to Inequalities

Values, corresponding to the Inequalities (1) to (4), of the respective examples of numerical values are shown in the following Table 13:

TABLE 13

|  | 1st example of numerical values | 2nd example of numerical values | 3rd example of numerical values | 4th example of numerical values |
|---|---|---|---|---|
| Inequality (1): R1_L1c/R2_L1c | 0.71121 | 0.44657 | 0.07192 | 0.09337 |
| Inequality (2): v_LG2Rp | 81.6 | 90.3 | 68.6 | 75.5 |
| Inequality (3): n_LG4Rn | 1.91082 | 1.91082 | 2.00100 | 2.00100 |
| Inequality (4): v_LG3p | 23.8 | 23.8 | 20.9 | 18 |

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

INDUSTRIAL APPLICABILITY

The imaging optical system according to the present disclosure is applicable to various types of cameras including digital still cameras, digital cameras, of which the lens is interchangeable, digital camcorders, cameras for cellphones and smartphones, and cameras for personal digital assistants (PDAs), surveillance cameras for surveillance systems, Web cameras, and onboard cameras. Among other things, the present disclosure is particularly suitably applicable as an imaging optical system for digital still camera systems, digital camcorder systems, and other camera systems that require high image quality.

The invention claimed is:

1. An imaging optical system comprising, as a plurality of lens groups:
   a first lens group having negative power;
   a second lens group having positive power;
   a third lens group having negative power; and
   a fourth lens group having negative power,
   the first, second, third, and fourth lens groups being arranged in this order such that the first lens group is located closer to an object than any other lens group and that the fourth lens group is located closer to an optical image than any other lens group, wherein
   while the imaging optical system is zooming from a wide-angle end toward a telephoto end during a shooting session, intervals between the plurality of lens groups change,
   the first lens group consists of:
   a first negative lens which is a single lens;
   a second negative lens;
   a third negative lens, which is a meniscus lens having negative power and having a convex surface facing the optical image; and
   a positive lens,
   the first, second, and third negative lenses and the positive lens being arranged in this order such that:
   (i) the first negative lens is located closer to the object than any other negative lens or the positive lens;
   (ii) the second negative lens is closest to the first negative lens in lenses, of the first lens group, disposed to the optical image side of the first negative lens;
   (iii) the third negative lens is closest to the second negative lens in lenses, of the first lens group, disposed to the optical image side of the second negative lens; and
   (iv) the positive lens is located closer to the optical image than the first, second, and third negative lenses,
   wherein the first negative lens and the second negative lens are separated from each other with an air gap,
   the third lens group consists of:
   a lens having positive power; and
   a lens having negative power,
   the lens having positive power and the lens having negative power being arranged in this order such that the lens having positive power is located closer to the object than the lens having negative power and that the lens having negative power is located closer to the optical image than the lens having positive power, and
   while the imaging optical system is focusing from an infinity focus point toward a close focus point, the third lens group moves along an optical axis.

2. The imaging optical system of claim 1, wherein the second negative lens is a meniscus lens having negative power and having a convex surface facing the object.

3. The imaging optical system of claim 1, wherein the third negative lens satisfies the following Inequality (1):

$$0.05<R1\_L1c/R2\_L1c<0.8 \quad (1)$$

where R1_L1c is a radius of curvature of a surface facing the object of the third negative lens and R2_L1c is a radius of curvature of a surface facing the optical image of the third negative lens.

4. The imaging optical system of claim 1, wherein the second lens group includes:
a front lens group having positive power;
an aperture stop; and
a rear lens group having negative power,
the front lens group, the aperture stop, and the rear lens group being arranged in this order such that the front lens group is located closer to the object than the aperture stop or the rear lens group and that the rear lens group is located closer to the optical image than the front lens group or the aperture stop,
the rear lens group includes at least one positive lens, the at least one positive lens satisfying the following Inequality (2):

$$v\_LG2Rp>65 \quad (2)$$

where v_LG2Rp is an abbe number with respect to a d-line of the positive lens of the rear lens group.

5. The imaging optical system of claim 1, wherein the fourth lens group includes at least one lens, the at least one lens including a negative lens as a lens located closest to the optical image, and
the negative lens satisfies the following Inequality (3):

$$1.8<n\_LG4Rn \quad (3)$$

where n_LG4Rn is a refractive index with respect to a d-line of the negative lens of the fourth lens group.

6. The imaging optical system of claim 1, wherein the lens having positive power of the third lens group satisfies the following Inequality (4):

$$14<v\_LG3p<35 \quad (4)$$

where v_LG3p is an abbe number with respect to a d-line of the lens having positive power of the third lens group.

7. A camera system comprising:
an interchangeable lens unit including the imaging optical system of claim 1; and
a camera body including an image sensor configured to receive an optical image formed by the imaging optical system and transform the optical image into an electrical image signal and a camera mount, the camera body being configured to be connected removably to the interchangeable lens unit via the camera mount,
the interchangeable lens unit forming the optical image of the object on the image sensor.

8. An image capture device configured to transform an optical image of an object into an electrical image signal and display and/or store the image signal transformed, the image capture device comprising:
the imaging optical system of claim 1 configured to form the optical image of the object; and
an image sensor configured to transform the optical image formed by the imaging optical system into the electrical image signal.

9. An imaging optical system comprising, as a plurality of lens groups:
a first lens group having negative power;
a second lens group having positive power;
a third lens group having negative power; and
a fourth lens group having negative power,
the first, second, third, and fourth lens groups being arranged in this order such that the first lens group is located closer to an object than any other lens group and that the fourth lens group is located closer to an optical image than any other lens group, wherein
while the imaging optical system is zooming from a wide-angle end toward a telephoto end during a shooting session, intervals between the plurality of lens groups change,
the first lens group consists of:
a first negative lens which is a single lens;
a second negative lens;
a third negative lens, which is a meniscus lens having negative power and having a convex surface facing the optical image; and
a positive lens,
the first, second, and third negative lenses and the positive lens being arranged in this order such that:
(i) the first negative lens is located closer to the object than any other negative lens or the positive lens;
(ii) the second negative lens is closest to the first negative lens in lenses, of the first lens group, disposed to the optical image side of the first negative lens;
(iii) the third negative lens is closest to the second negative lens in lenses, of the first lens group, disposed to the optical image side of the second negative lens; and
(iv) the positive lens is located closer to the optical image than the first, second, and third negative lenses,
wherein the first negative lens and the second negative lens are separated from each other with an air gap,
the third lens group includes at least two lenses,
while the imaging optical system is focusing from an infinity focus point toward a close focus point, the third lens group moves along an optical axis, and
the second lens group includes:
a front lens group having positive power;
an aperture stop; and
a rear lens group having negative power,
the front lens group, the aperture stop, and the rear lens group being arranged in this order such that the front lens group is located closer to the object than the aperture stop or the rear lens group and that the rear lens group is located closer to the optical image than the front lens group or the aperture stop.

10. An imaging optical system comprising, as a plurality of lens groups:
a first lens group having negative power;
a second lens group having positive power;
a third lens group having negative power; and
a fourth lens group having negative power,
the first, second, third, and fourth lens groups being arranged in this order such that the first lens group is located closer to an object than any other lens group and that the fourth lens group is located closer to an optical image than any other lens group, wherein
while the imaging optical system is zooming from a wide-angle end toward a telephoto end during a shooting session, intervals between the plurality of lens groups change, the first lens group consists of:
a first negative lens which is a single lens;
a second negative lens;
a third negative lens, which is a meniscus lens having negative power and having a convex surface facing the optical image; and
a positive lens,
the first, second, and third negative lenses and the positive lens being arranged in this order such that:
(i) the first negative lens is located closer to the object than any other negative lens or the positive lens;
(ii) the second negative lens is closest to the first negative lens in lenses, of the first lens group, disposed to the optical image side of the first negative lens;
(iii) the third negative lens is closest to the second negative lens in lenses, of the first lens group, disposed to the optical image side of the second negative lens; and
(iv) the positive lens is located closer to the optical image than the first, second, and third negative lenses,
wherein the first negative lens and the second negative lens are separated from each other with an air gap,
the third lens group consists of:
a biconvex lens; and
a biconcave lens, the biconvex lens and the biconcave lens forming a bonded lens by being bonded together, and
while the imaging optical system is focusing from an infinity focus point toward a close focus point, the third lens group moves along an optical axis.

11. An imaging optical system comprising, as a plurality of lens groups:
a first lens group having negative power;
a second lens group having positive power;
a third lens group having negative power; and
a fourth lens group having negative power,
the first, second, third, and fourth lens groups being arranged in this order such that the first lens group is located closer to an object than any other lens group and that the fourth lens group is located closer to an optical image than any other lens group, wherein
while the imaging optical system is zooming from a wide-angle end toward a telephoto end during a shooting session, intervals between the plurality of lens groups change,
the first lens group consists of:
a first negative lens which is a single lens;
a second negative lens;
a third negative lens, which is a meniscus lens having negative power and having a convex surface facing the optical image; and
a positive lens,
the first, second, and third negative lenses and the positive lens being arranged in this order such that:
(i) the first negative lens is located closer to the object than any other negative lens or the positive lens;
(ii) the second negative lens is closest to the first negative lens in lenses, of the first lens group, disposed to the optical image side of the first negative lens;
(iii) the third negative lens is closest to the second negative lens in lenses, of the first lens group, disposed to the optical image side of the second negative lens; and
(iv) the positive lens is located closer to the optical image than the first, second, and third negative lenses,
wherein the first negative lens and the second negative lens are separated from each other with an air gap,
the third lens group includes at least two lenses,
the third lens group includes at least one positive lens,
the at least one positive lens satisfies the following Inequality (4):

$$14 < v\_LG3p < 35 \tag{4}$$

where $v\_LG3p$ is an abbe number with respect to a d-line of positive lens of the third lens group,
while the imaging optical system is focusing from an infinity focus point toward a close focus point, the third lens group moves along an optical axis.

* * * * *